(12) United States Patent
Katayama

(10) Patent No.: US 6,282,164 B1
(45) Date of Patent: Aug. 28, 2001

(54) OPTICAL HEAD HAVING A PHASE-SHIFTING DIFFRACTION GRATING

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/177,578

(22) Filed: Oct. 23, 1998

(30) Foreign Application Priority Data

Oct. 30, 1997 (JP) .................................................. 9-299079

(51) Int. Cl.[7] ........................................................ G11B 7/13
(52) U.S. Cl. ................................. 369/112.12; 369/44.37; 369/112.15
(58) Field of Search ................................. 369/44.37, 118, 369/121, 112, 103, 109, 110, 120, 44.23, 13, 44.41, 54

(56) References Cited

U.S. PATENT DOCUMENTS

| | | | |
|---|---|---|---|
| 4,592,038 | * 5/1986 | Kubota et al. | 369/121 |
| 4,945,529 | * 7/1990 | Ono et al. | 369/109 |
| 5,353,267 | * 10/1994 | Katayama | 369/13 |
| 5,737,296 | * 4/1998 | Komma et al. | 369/103 |
| 5,835,471 | * 11/1998 | Miyamoto et al. | 369/109 |
| 5,909,416 | * 6/1999 | Matsui | 369/44.41 |

FOREIGN PATENT DOCUMENTS 9-81942   3/1997  (JP) .

* cited by examiner

*Primary Examiner*—Ali Neyzari
*Assistant Examiner*—Kim-Kwok Chu
(74) *Attorney, Agent, or Firm*—McGinn & Gibb, PLLC

(57) ABSTRACT

An optical head having a phase-shifting diffraction grating includes a diffraction grating for dividing the light from a light source into a plus first order diffracted light, a zero order light, and a minus first order diffracted light. An objective lens focuses light from the light source passing through the diffraction grating onto an optical recording medium, and a photodetector receives a reflected light from the optical recording medium. A signal processing circuit generates a track error signal according to an output of the photodetector. The phase difference between lights on different regions of the diffraction grating is π/2 radians allowing the optical head to detect a land/groove position on an optical recording medium even if the land and groove have identical widths.

18 Claims, 17 Drawing Sheets

NOTES: 0-TH = 0-TH ORDER LIGHT
+1ST = +1ST-ORDER LIGHT
−1ST = −1ST-ORDER LIGHT (NOTES: 0-TH = 0-TH ORDER LIGHT
+1ST = +1ST-ORDER LIGHT
−1ST = −1ST-ORDER LIGHT)

(NOTES: 0-TH = 0-TH ORDER LIGHT
+1ST = +1ST-ORDER LIGHT
−1ST = −1ST-ORDER LIGHT)

OPTICAL HEAD HAVING A PHASE-SHIFTING DIFFRACTION GRATING

BACKGROUND OF THE INVENTION

1. Field of the Invention

The present invention relates to an optical head apparatus and in particular, to an optical head apparatus causing no offset in a track error signal even if an objective lens is shifted and capable of detecting a land/groove position.

2. Description of the Related Art

In a conventional optical head apparatus, the push-pull method is known as one of the track error signal detecting methods. The push-pull method is realized by a simple configuration of an optical system and an electric circuit but an offset is caused in the error detecting signal if an objective lens is shifted.

To cope with this, there is known a method to use a diffraction grating to generate three beams of 0-th order light, plus and minus $1^{st}$-order diffracted lights, so that the offset of the track error signal caused by the objective lens shift is cancelled by a difference between the 0-th order light and the plus and minus $1^{st}$-order diffracted lights. An optical recording medium has a land and a groove. In this method, the 0-th order light is applied to the land (or the groove) and the plus and minus $1^{st}$-order diffracted lights are applied to the adjacent grooves (or lands). However, in an optical recording medium having a track pitch different from a design, it is impossible to apply the three focal spots as mentioned above and accordingly, it is impossible to cancel the track error signal offset upon an objective lens shift.

Japanese Patent Publication (Unexamined) No. 9-81942 discloses a method to use a diffraction grating consisting of two regions one of which has a phase delayed by $\pi$ from the phase of the other, so as to generate three beams of 0-th order light and plus and minus $1^{st}$-order diffracted lights so that differences between the 0-th order light and the plus and minus $1^{st}$-order lights are used to cancel a track error signal offset at an objective lens shift. In this method, the 0-th order light and the plus and minus $1^{st}$-order diffracted lights is applied to a single land (or groove). Consequently, even in an optical recording medium having a track pitch different from a predetermined design, the arrangement of the three focal spots is not changed, enabling to cancel the offset of the track error signal caused by the objective lens shift.

FIG. 17 shows a configuration of a conventional optical head apparatus using the aforementioned method.

A light emitted from a semiconductor laser 51 is made into parallel lights by a collimator lens 52 and divided by a diffraction grating 53d into 0-th order light and plus and minus diffracted lights. Approximately half of these lights are passed through a beam splitter 54 and focused by an objective lens 55 on a disc 56. The three lights reflected from the disc 56 are introduced via the objective lens 55 into the beam splitter 54, where about half of the lights is reflected to be received via a composite lens 57 by a photo detector 58d. The composite lens 57 consists of a convex lens and a cylindrical lens. The photo detector 58d is arranged in an intermediate position between two focal lines of the composite lens 57.

FIG. 18 is a plan view of the diffraction grating 53d. The diffraction grating 53d is divided into a region 78a and a region 78b. The line of this division is a straight line in a tangential direction (parallel to the track) passing through the optical axis of the incident light 59. The phase difference between the region 78a and the region 78b is $\pi$. Accordingly, there is a phase difference of $\pi$ between the plus and minus $1^{st}$-order diffracted lights from the region 78a and the plus and minus $1^{st}$-order diffracted lights from the region 78b.

FIG. 19 shows an arrangement of the focal spots on the disc 56. The 0-th order light, the plus $1^{st}$-order diffracted light, and the minus $1^{st}$-order diffracted light respectively correspond to focal spots 79a, 79b, and 79c, which are arranged on a single track 61 (land or groove). The focal spots 79b and 79c have two peaks having an identical intensity in a radial direction (vertical direction to the track).

FIG. 20 shows light receiving blocks of the photo detector 58d and a light spot arrangement on the photo detector 58d. A light spot 80a corresponds to the 0-th order light which is received by the light receiving block divided into four light receiving sections 81a to 81d by two straight lines of tangential direction passing through the optical axis and the radial direction. A light spot 80b corresponds to the plus 1st-order diffracted light, which is received by a light receiving block divided into a light receiving sections 81e and 81f by a tangential line passing through the optical axis. A light spot 80c corresponds to the minus $1^{st}$-order diffracted light, which is received by a light receiving block divided into light receiving sections 81g and 81h by a tangential line passing through the optical axis. The focal spots 79a, 79b, and 79c are arranged in the tangential direction on the disc 56, but the light spots 80a, 80b, and 80c on the photo detector 58d are arranged in the radial direction by the function of the composite lens 57.

If it is assumed that outputs of the light receiving sections 81a to 81h are V81a to V81h, the focus error signal can be obtained from the calculation $(V81a+V81d)-(V81b+V81c)$ according to the astigmatism. The track error signal can be obtained by the differential push-pull method as follows: $\{(V81a+V81b)-(V81c+V81d)\}-K\{(81e+V81g)-(V81f+V81h)\}$ (wherein K is a constant). Moreover, the reproduction signal can be obtained from the calculation of $V81a+V81b+V81c+V81d$.

FIG. 21 shows a phase change of the 0-th order light, the plus and minus $1^{st}$-order diffracted lights from the disc 56 caused by a position difference between the focal spot 79a on the disc 56 and the track 61. The focal spot 79a is formed by a beam 66d.

FIG. 21A, case (1), the light beam 66d is applied to a groove 67a. Here, if the 0-th order light is assumed to have phase 0, the plus and minus $1^{st}$-order diffracted lights have a phase of $-\pi/2$. In FIG. 21A, case (2), the light beam 66d is applied to a boundary of the groove 67a and the land 67b. Here, with respect to case (1), the plus $1^{st}$-order diffracted light has a phase delayed by $\pi/2$, and the minus $1^{st}$-order diffracted light has a phase advancing by $\pi/2$. Accordingly, if the 0-th order light has a phase 0, the plus $1^{st}$-order diffracted light has a phase of plus and minus $\pi$, and a minus $1^{st}$-order diffracted light has a phase 0. In FIG. 21A, case (3), the light beam 66d is applied to the land 67b. Here, with respect to case (2), the plus $1^{st}$-order diffracted light has a phase delayed by $\pi/2$, and the minus $1^{st}$-order diffracted light has a phase advancing by d $\pi/2$. Accordingly, if the 0-th order light has phase 0, the plus and minus $1^{st}$-order diffracted lights have a phase of $\pi/2$. In FIG. 21A, case (4), the light beam 66d is applied to a boundary between the land 67b and the groove 67a. Here, with respect to case (3), the plus $1^{st}$-order diffracted light has a phase delayed by $\pi/2$, and the minus $1^{st}$-order diffracted light has a phase advancing by $\pi/2$. Accordingly, if the 0-th order light has phase 0, the plus $1^{st}$-order diffracted light has phase 0 and the minus $1^{st}$-order diffracted light has phase plus and minus $\pi$.

FIG. 21B shows a region 82a containing both of the 0-th order light and the plus $1^{st}$-order diffracted light and a region 82b containing both of the 0-th order light and the minus $1^{st}$-order diffracted light. These regions 82a and 82b have light intensities as follows. In FIG. 21A, case (1), the phase difference between the 0-th order light and the plus $1^{st}$-order diffracted light and the phase difference between the 0-th order light and the minus $1^{st}$-order diffracted light are both $\pi/2$. Accordingly, the light intensity of region 82a is equal to the light intensity of region 82b. In FIG. 21A, case (2), the phase difference between the 0-th order light and the plus $1^{st}$-order diffracted light is $\pi$, and their intensities are weakened by interference. On the other hand, the phase difference between the 0-th order light and the minus $1^{st}$-order diffracted light is 0 and their intensities are intensified by interference. Accordingly, the intensity of the region 82a is low and the intensity of the region 82b is high. In FIG. 21A, case (3), the phase difference between the 0-th order light and the plus $1^{st}$-order diffracted light and the phase difference between the 0-th order light and the minus $1^{st}$-order diffracted light are both $\pi/2$. Accordingly, the light intensity of region 82a is equal to the light intensity of region 82b. In FIG. 21A, case (4), the phase difference between the 0-th order light and the plus $1^{st}$-order diffracted light is 0 and their intensities are increased by interference. On the other hand, the phase difference between the 0-th order light and the minus $1^{st}$-order diffracted light is $\pi$ and their intensities are weakened by interference. Accordingly, the intensity of the region 82a is high and the intensity of the region 82b is low.

FIG. 22 shows a focal spot 79b and phase changes of the 0-th order light and the plus and minus $1^{st}$-order diffracted light from the disc 56 caused by a position shift of the track 61. The focal spot 79b is formed by a light beam 66e. The light beam 66e has a phase at the right side shifted by $\pi$ from a phase at the left side.

In FIG. 22A, case (1), the light beam 66e is applied to the groove 67a. Here, if it is assumed that the 0-th order light has a phase $-\pi/2$ at the left half and $\pi/2$ at the right half, the plus and minus $1^{st}$-order diffracted light has a phase $-\pi$ at the left side and phase 0 at the right side. In FIG. 22A, case (2), the light beam 66e is applied to a boundary between the groove 67a and the land 67b. Here, with respect to case (1), the plus $1^{st}$-order diffracted light has a phase delayed by $\pi/2$ and the minus $1^{st}$-order diffracted light has a phase advanced by $\pi/2$. Accordingly, if it is assumed that the 0-th order light has a phase $-\pi/2$ at the left side and a phase $\pi/2$ at the right side, then the plus $1^{st}$-order diffracted light has a phase $\pi/2$ at the left side and a phase $-\pi/2$ at the right side, and the minus $1^{st}$-order diffracted light has a phase $-\pi/2$ at the left side and a phase $\pi/2$ at the right side. In FIG. 22A, case (3), the light beam 66e is applied to the land 67b. Here, with respect to case (2), the plus $1^{st}$-order diffracted light has a phase delayed by $\pi/2$ and the minus $1^{st}$-order diffracted light has a phase advanced by $\pi/2$. Accordingly, if it is assumed that the 0-th order light has a phase $-\pi/2$ at the left side and a phase $\pi/2$ at the right side, then each of the plus and minus $1^{st}$-order diffracted light has a phase 0 at the left side and a phase $\pi$ at the right side. In FIG. 22A, case (4), the light beam 66e is applied to the boundary between the land 67b and the groove 67a. Here, with respect to case (3), the plus $1^{st}$-order diffracted light has a phase delayed by $\pi/2$ and the minus $1^{st}$-order diffracted light has a phase advanced by $\pi/2$. Accordingly, if it is assumed that the 0-th order light has a phase $-\pi/2$ at the left side and a phase $\pi/2$ at the right side, then the plus $1^{st}$-order diffracted light has a phase $-\pi/2$ at the left side and a phase $\pi/2$ at the right side, and the minus $1^{st}$-order diffracted light has a phase $\pi/2$ at the left side and a phase $-\pi/2$ at the right side.

FIG. 22b shows a region 83a containing both of the 0-th order light and the plus $1^{st}$-order diffracted light and a region 83b containing both of the 0-th order light and the minus $1^{st}$-order diffracted light. These regions have light intensities as follows. In FIG. 22A, case (1), the phase difference between the 0-th order light and the plus $1^{st}$-order diffracted light and the phase difference between the 0-th order light and the minus $1^{st}$-order diffracted light are both $\pi/2$. Accordingly, the light intensity of region 83a is equal to the light intensity of region 83b. In FIG. 22A, case (2), the phase difference between the 0-th order light and the plus $1^{st}$-order diffracted light is 0, and their intensities are increased by interference. On the other hand, the phase difference between the 0-th order light and the minus $1^{st}$-order diffracted light is $\pi$ and their intensities are weakened by interference. Accordingly, the intensity of the region 83a is high and the intensity of the region 83b is low. In FIG. 22A, case (3), the phase difference between the 0-th order light and the plus $1^{st}$-order diffracted light and the phase difference between the 0-th order light and the minus $1^{st}$-order diffracted light are both $\pi/2$. Accordingly, the light intensity of region 83a is equal to the light intensity of region 83b. In FIG. 22A, case (4), the phase difference between the 0-th order light and the plus $1^{st}$-order diffracted light is $\pi$ and their intensities are weakened by interference. On the other hand, the phase difference between the 0-th order light and the minus $1^{st}$-order diffracted light is 0 and their intensities are increased by interference. Accordingly, the intensity of the region 83a is low and the intensity of the region 83b is high.

FIG. 23 shows various waveforms related to the track error signal. The horizontal axis represents a positional difference between the focal spot on the disc 56 and the track 61. Arrows a to d respectively correspond to the cases (1) to (4) in FIG. 21A and FIG. 22A.

The region 82a in FIG. 21B corresponds to the light receiving sections 81c and 81d of the photo detector 58d. The region 82b in FIG. 21B corresponds to the light receiving sections 81a and 81b of the photo detector 58d. Here, the waveform of (V81a+V81b)−(V81c+V81d) is shown by a solid line in FIG. 23A. The region 83a in FIG. 22B corresponds to the light receiving section 81f of the photo detector 58d. The region 83b in FIG. 22B corresponds to the light receiving sections 81e of the photo detector 58d. Here, the waveform of (V81e−V81f) is shown by a solid line in FIG. 23B. Similarly, the waveform of (V81g−V81h) is as shown by a solid line in FIG. 23C. From the waveforms of FIG. 23B and FIG. 23C, the waveform of (V81e+V81g)−(V81f+V81h) is as shown by a solid line in FIG. 23D. Because of the waveforms of FIG. 23A and FIG. 23D having phases reversed to each other, the waveform of {(V81a+V81b)−(V81c+V81d)}−K{(V81e+V81g)−(V81f+V81h)} is as shown by a solid line in FIG. 23E.

When the objective lens is shifted in the radial direction, the light spots 80a to 80c on the photo detector 58d are also shifted in the radial direction. If it is assumed that the light spots 80a to 80c are shifted upward in FIG. 20, the outputs of the light receiving sections 81a and 81b are increased and the outputs of the light receiving sections 81c and 81d are decreased. Accordingly, the waveform of (V81a+V81b)−(V81c+V81d) is as shown by a dotted line in FIG. 23A. Moreover, the output of the light receiving section 81e is increased and the output of the light receiving section 81f is decreased. Accordingly, the waveform of (V81g−V81h) is as shown by a dotted line in FIG. 23B. Similarly, the waveform of (V81g–V81h) is as shown by a dotted line in FIG. 23C. From the dotted lines in FIG. 23B and FIG. 23C, the waveform of (V81e+V81g)–(V81f+V81h) becomes as shown by a dotted line in FIG. 23D. The waveforms of FIG. 23A and FIG. 23D have phases reversed to each other but DC components at the objective lens shift have identical signs. Accordingly, the track error signal {(V81a+V81b)–(VB1c+V81d)}–K{(V81e+V81g)–(V81f+V81h)} has a waveform as shown by a solid line in FIG. 23E. That is, even if the objective lens is shifted, no offset is caused in the track error signal.

Here, in the optical head apparatus, when accessing the land (or the groove), in order to prevent run-away of the track servo, it is preferable to pull in the track servo after confirming that the focal spot is on the land (or the groove). For this, it is necessary to provide a land/groove position detecting function for detecting on which of the land and groove the focal spot resides.

However, in a conventional optical head apparatus, there is a problem that it is not always possible to detect the land/groove position. In case the groove 67a and the land 67b have different widths, the level of (V81a+V81b+V81c+V81d) varies depending on whether the focal spot 79a is on the groove 67a or on the land 67b. This enables to detect the land/groove position. However, in case when the groove 67a and the land 67b have identical widths, the level of (V81a+V81b+V81c+V81d) is identical when the focal spot 79a is on the groove 67a and when on the land 67b. Accordingly, it is impossible to detect the land/groove position.

SUMMARY OF THE INVENTION

It is therefore an object of the present invention to provide an optical head apparatus causing no offset in a track error signal even if an objective lens is shifted and capable of detecting a land/groove position even if the land and the groove have identical widths.

In order to achieve the aforementioned object, the optical head apparatus according to the present invention comprises: a light source; a diffraction grating for dividing the light from this light source into a plus $1^{st}$-order diffracted light, a 0-th order light, and a minus $1^{st}$-order diffracted light; an objective lens for focusing the light passing through the diffraction grating onto an information recording plane of an optical recording medium; a photo detector for receiving a reflected light from said optical recording medium; and a signal processing circuit for generating a track error signal according to an output of said photo detector. The diffraction grating has a light incident plane divided into a plurality of regions and is set so that adjacent regions have diffracted light phases different from each other. The plus $1^{st}$-order diffracted light, the 0-th order light, and the minus $1^{st}$-order diffracted light are controlled to be arranged on a single land or groove of the optical recording medium. In the present invention the diffraction grating is constructed so that the adjacent regions have diffracted light phases shifted by $\pi/2$ from each other. Moreover, the photo detector has a plurality of light receiving blocks for receiving the plus $1^{st}$-order diffracted light and the minus $1^{st}$-order diffracted light corresponding to the plurality of regions of the diffraction grating. Furthermore, the signal processing circuit generates, according to outputs of the plurality of light receiving blocks, a signal for deciding whether a focal spot on the optical recording medium is arranged on the land or groove.

Here, the diffraction grating may be divided into two regions by a straight line parallel to a track of the optical recording medium. Moreover, the diffraction grating may be divided into three regions by straight lines parallel to the track of the optical recording medium. Furthermore, the diffraction grating may be divided into four regions by a straight line parallel to the track of the optical recording medium and a straight line vertical to the track of the optical recording medium. Moreover, the present invention may comprise a holographic optical element between the optical recording medium and the photo detector, for diffracting a reflected light from the optical recording medium. All these are intended for achieving the aforementioned object.

In the optical head apparatus according to the present invention, a light emitted from the light source is divided by the diffraction grating having adjacent regions with phases shifted by $\pi/2$ from each other, into three parts: 0-th order light, and plus and minus $1^{st}$-order diffracted lights, so that three focal spots are arranged on a single track of the optical recording medium. A land/groove position is detected according to the light quantity of the plus and minus $1^{st}$-order diffracted lights from the respective regions of the diffraction grating reflected by the optical recording medium. With this configuration, the plus and minus $1^{st}$-order diffracted lights are used to generate a signal having a phase shifted by $\pi/2$ with respect to a track error signal, so that the signal can be used for a land/groove position detection.

DESCRIPTION OF THE PREFERRED EMBODIMENTS

Description will now be directed to a first embodiment of the present invention with reference to FIG. 1 to FIG. 6.

Figure 1:
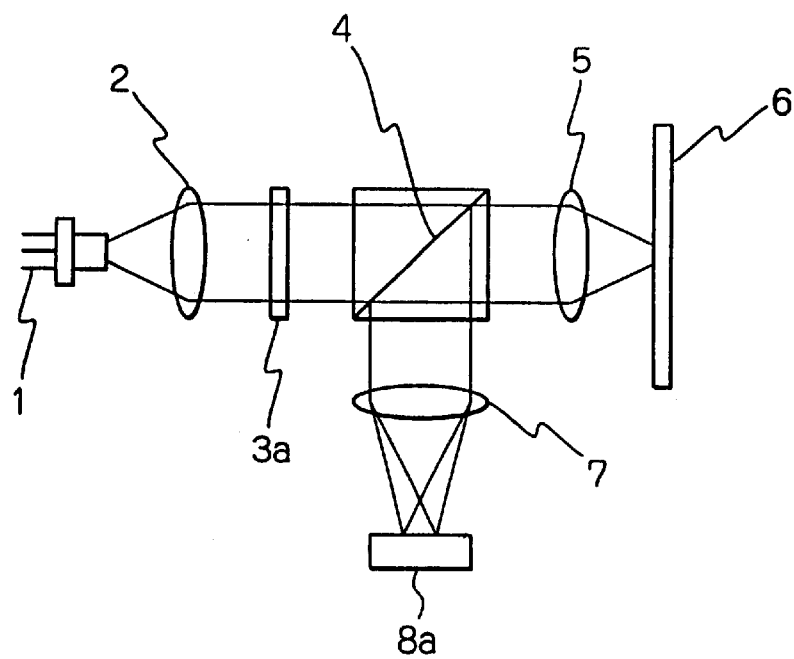
FIG. 1 is a block diagram showing a configuration of an optical head apparatus according to a first embodiment of the present invention.

FIG. 1 shows a configuration of an optical head apparatus according to the first embodiment. A semiconductor laser 1 emits a light which is made into a parallel light by a collimator lens 2 and divided by a diffraction grating 3a into a 0-th order light, plus and minus $1^{st}$-order lights. About half of the lights passes through a beam splitter 4 and focused by an objective lens 5 on a disc 6. The three lights reflected from the disc 6 pass through the objective lens 5 and about half of the lights is reflected by the beam splitter 4 and received via a composite lens 7 by a photo detector 8a. The composite lens 7 is a combination of a convex lens and a cylindrical lens. The photo detector 8a is arranged at an intermediate position between two focal lines of the composite lens 7.

Figure 2:
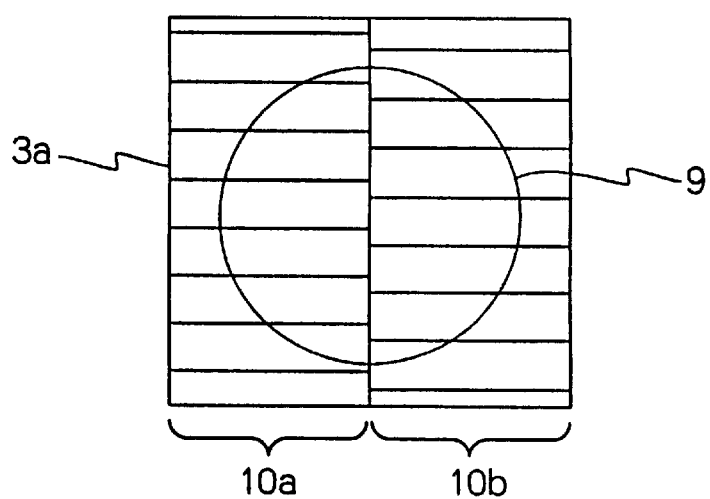
FIG. 2 is a plan view showing a diffraction grating used in the optical head apparatus according to the first embodiment of the present invention.

FIG. 2 is a plan view of the diffraction grating 3a. The diffraction grating 3a is divided into an area 10a and an area 10b by a straight line in the tangential direction passing through the optical path of the incident light 9. The area 10a has a phase shifted by $\pi/2$ from a phase of area 10b. The remaining parts are constructed in the same way as in the conventional apparatus. Accordingly, if it is assumed in FIG. 2 that the plus $1^{st}$-order diffracted light is a light diffracted upward and the minus $1^{st}$-order diffracted light is a light diffracted downward, the plus $1^{st}$-order diffracted light from the area 10a is delayed by $\pi/2$ from the plus $1^{st}$-order diffracted light from the area 10b, and the minus $1^{st}$-order diffracted light from the area 10a is advanced by $\pi/2$ from the minus $1^{st}$-order diffracted light from the area 10b.

Figure 3:
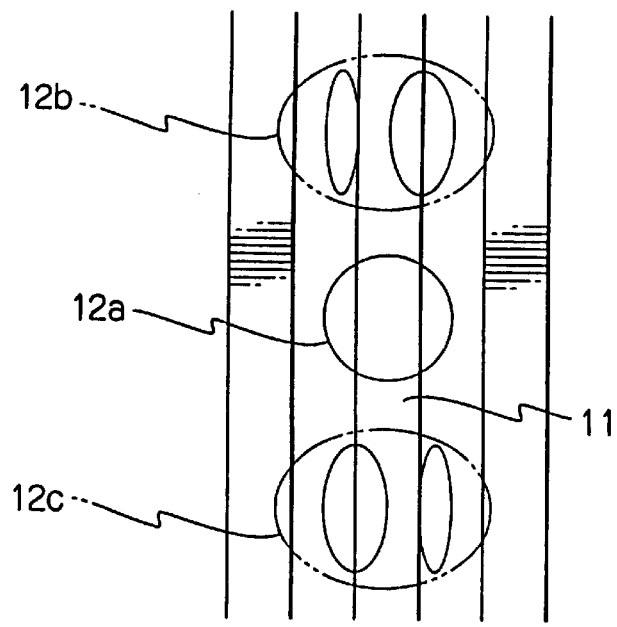
FIG. 3 shows an arrangement of a focal spot on a disc in the optical head apparatus according to the first embodiment of the present invention.

FIG. 3 shows a focal spot arrangement on the disc 6. Focal spots 12a, 12b, and 12c respectively correspond to the 0-th order light, the plus $1^{st}$-order diffracted light and the minus $1^{st}$-order diffracted light from the diffraction grating 3a, and they are arranged on a single track 11 (land or groove). The focal spot 12b has two peaks in the radial direction with a low intensity at the left and a high intensity at the right. The focal spot 12c has two peaks in the radial direction with a high intensity at the left and a low intensity at the right.

Figure 4:
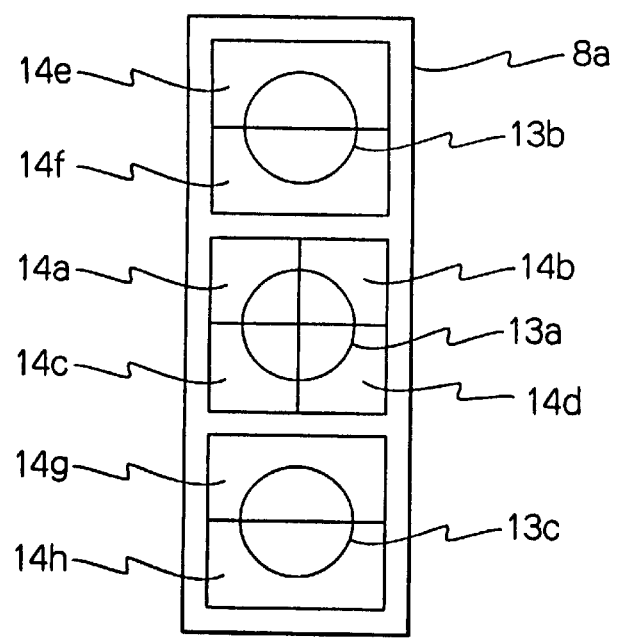
FIG. 4 shows light receiving sections of a photo detector and an arrangement of a focal spot on the photo detector in the optical head apparatus according to the first embodiment of the present invention.

FIG. 4 shows light receiving sections of the photo detector 8a and a light spot arrangement on the photo detector 8a. A light spot 13a corresponds to the 0-th order light from the diffraction grating 3a, which is received by light receiving sections 14a to 14d divided by two lines: a tangential direction line passing through the optical axis and a radial direction line. A light spot 13b corresponds to the plus $1^{st}$-order diffracted light from the diffraction grating 3a, which is received by light receiving sections 14e and 14f divided by a tangential direction line passing through the optical axis. A light spot 13c corresponds to the minus $1^{st}$-order diffracted light from the diffraction grating 3a, which is received by light receiving sections 14g and 14h divided by a tangential direction line passing through the optical axis. A sequence of the focal spots 12a to 12c is in a tangential direction, but an optical system is provided so that the sequence of the light spots 13a to 13c on the photo detector 8a is made into a radial direction by function of the composite lens 7.

If outputs to the light receiving sections 14a to 14h are assumed to be V14a to V14h, the focus error signal can be obtained according to the astigmatism from the calculation of $(V14a+V14d)-(V14b+V14c)$. The track error signal is obtained according to the differential push-pull method from the calculation of $\{(V14a+V14b)-(V14c+V14d)\}-K\{(V14e+V14g)-(V14f+V14h)\}$ (wherein K is a constant). The land/groove position detecting signal can be obtained from the calculation of $(V14e+V14h)-(V14f+V14g)$. Moreover, the reproduction signal can be obtained from the calculation of $V14a+V14b+V14c+V14d$. These calculations can be carried out by a corresponding signal processing system (not depicted).

Figure 21A:
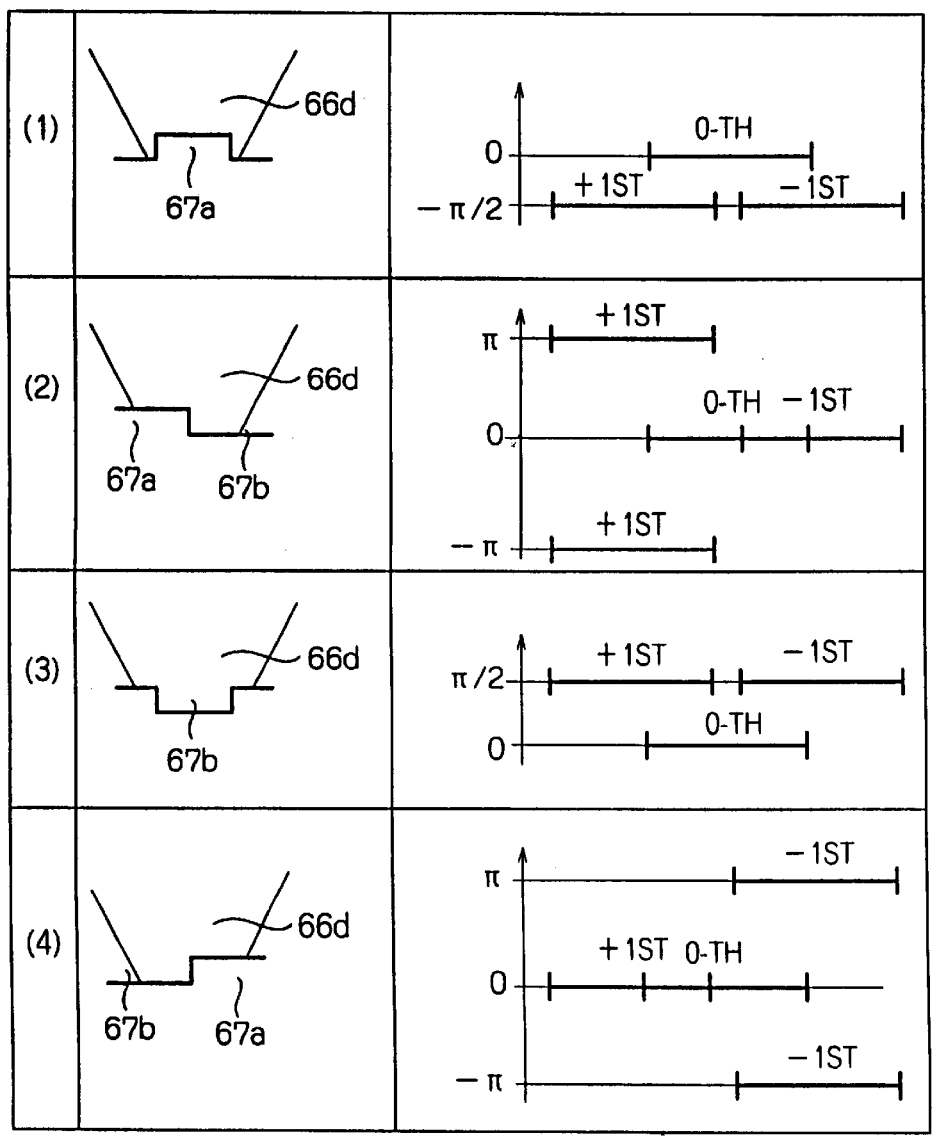
FIG. 21A shows phase changes of the 0-th order light and the plus and minus $1^{st}$-order diffracted lights from the disc caused by a track position shift in the conventional optical head apparatus.
Figure 21B:
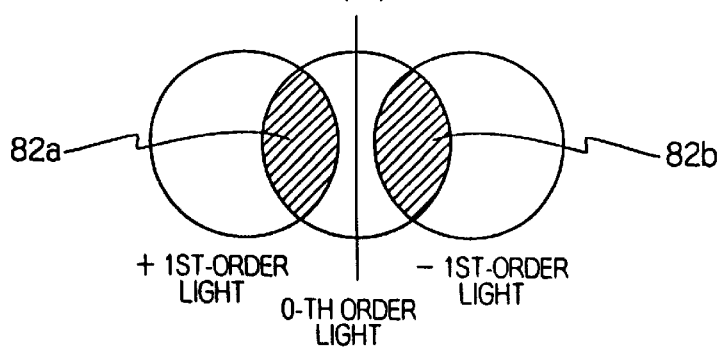
FIG. 21B shows reflected lights from the disc in the conventional optical head apparatus.
Figure 22A:
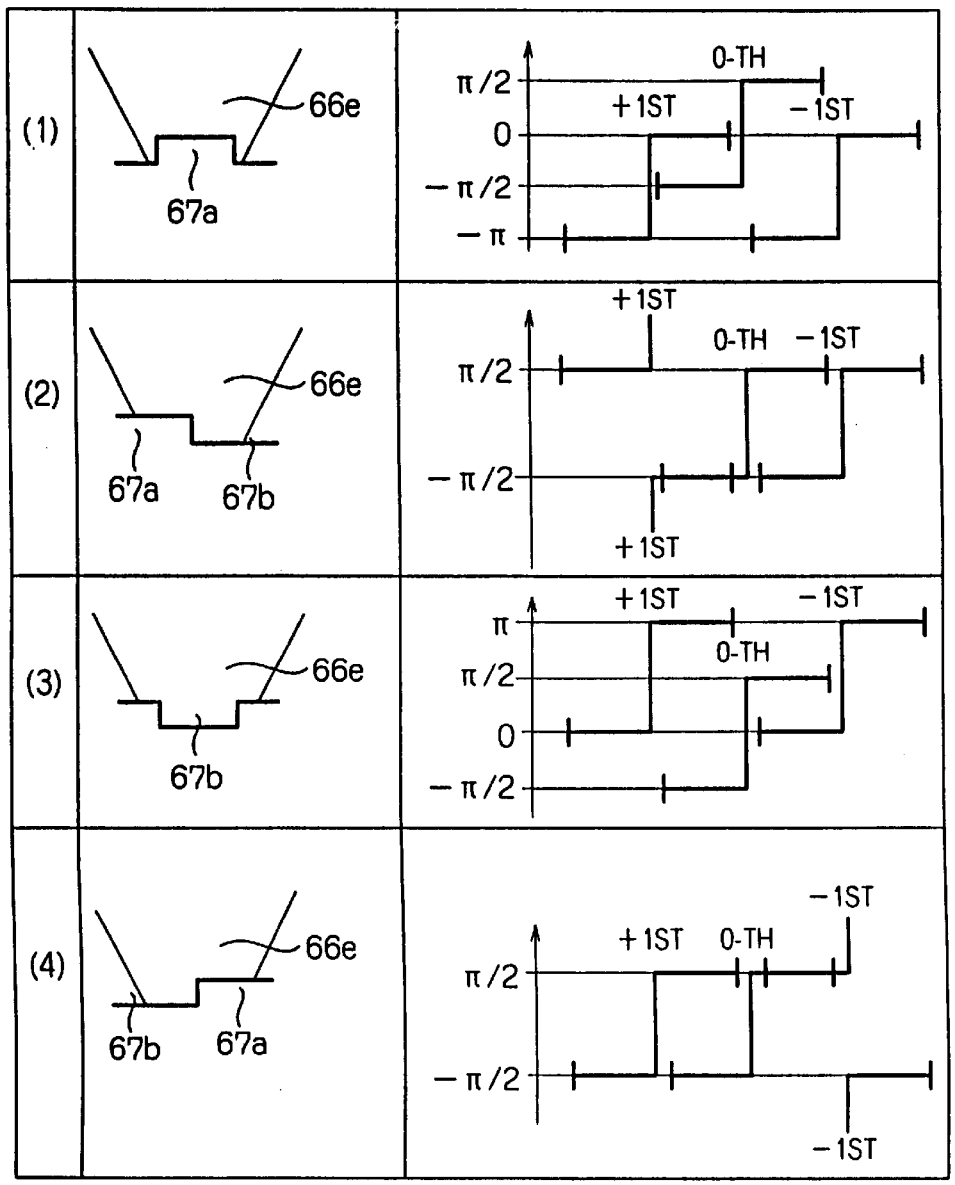
FIG. 22A shows phase changes of the 0-th order light and the plus and minus $1^{st}$-order diffracted lights from the disc caused by a track position shift in the conventional optical head apparatus.
Figure 22B:
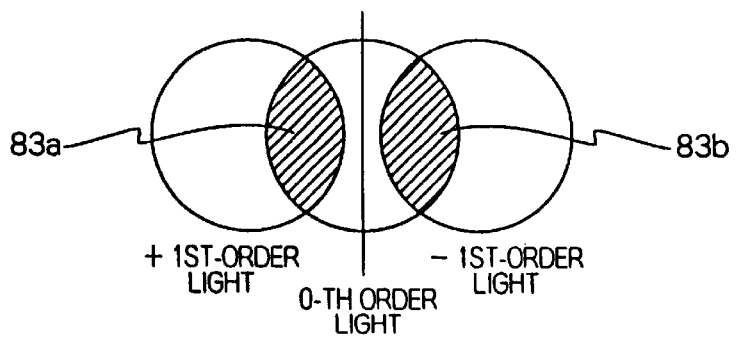
FIG. 22B shows reflected lights from the disc in the conventional optical head apparatus.
Figure 23A:
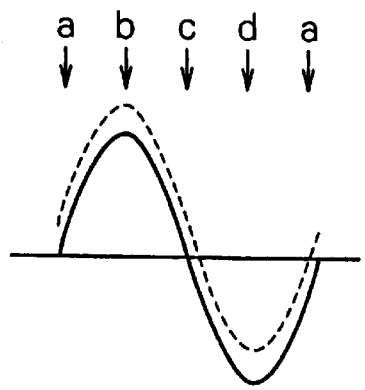
FIG. 23A to FIG. 23E show waveforms related to a track error signal in the conventional optical head apparatus.
Figure 23B:
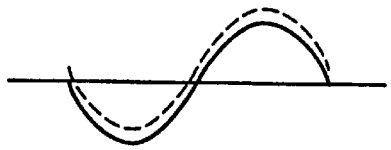
Figure 23C:
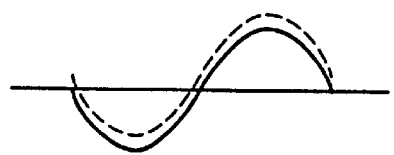
Figure 23D:
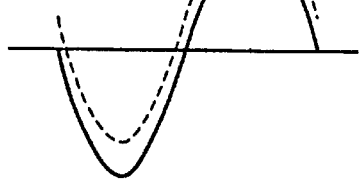
Figure 23E:
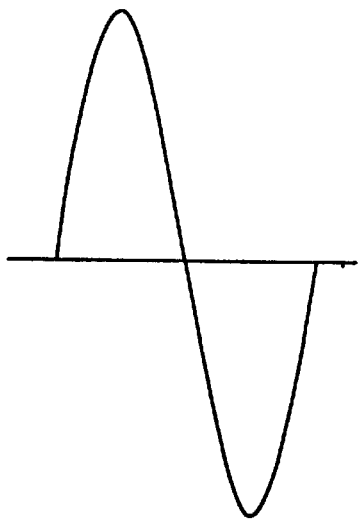

Phase differences of the 0-th order light, the plus and minus $1^{st}$-order diffracted lights from the disc 6 caused by a position shift between the focal spot 12a and the track 11 on the disc 6 are as shown in FIG. 21.

Figure 5:
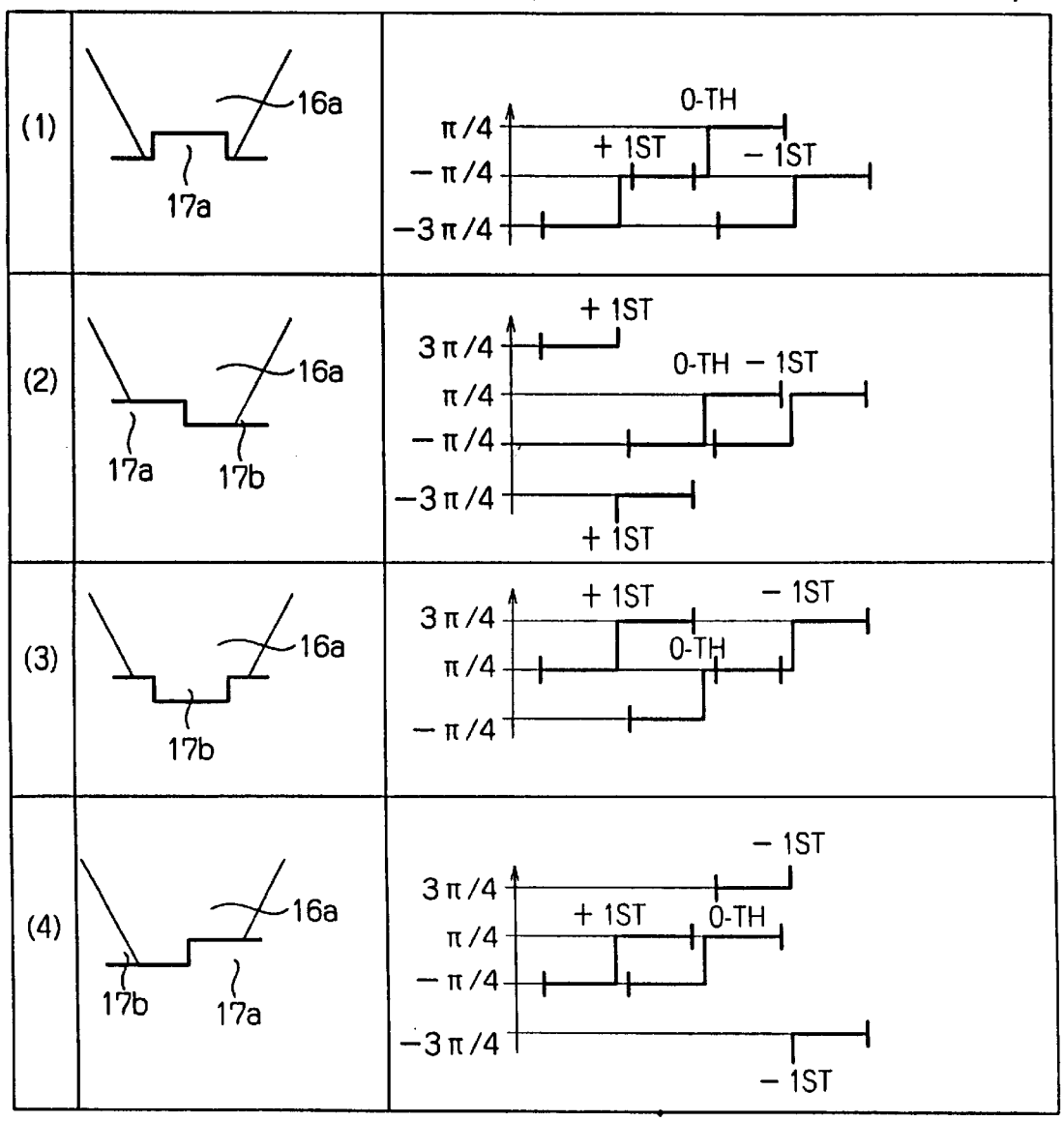
FIG. 5A shows phase changes of the 0-th order light and the plus and minus $1^{st}$-order diffracted lights from the disc caused by a track position shift in the first embodiment.
FIG. 5B shows reflected lights from the disc in the first embodiment.
Figure 5:
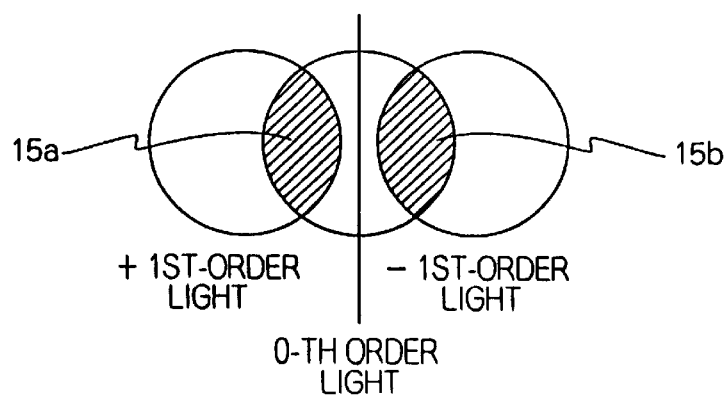

FIG. 5 shows a phase change of the 0-th order light and the plus and minus $1^{st}$-order diffracted lights from the disc 6 caused by a position shift between the focal spot 12b and the track 11 on the disc 6. The focal spot 12b is formed by a light beam 16a. The light beam 16a has a phase at the left side delayed by $\pi/2$ from the phase at the right side.

In FIG. 5A, case (1), the light beam 16a is applied to a groove 17a. Here, if it is assumed that the 0-th order light has a phase $-\pi/4$ at the left side and a phase $\pi/4$ at the right side, the plus and minus $1^{st}$-order diffracted lights have a phase $-3$ π/4 at the left side and −π/4 at the right side. In FIG. 5A, case (2), the light beam 16a is applied to a boundary between the groove 17a and the land 17b. Here, with respect to case (1), the plus $1^{st}$-order diffracted light has a phase delayed by π/2 and the minus $1^{st}$-order diffracted light has a phase advanced by π/2. Accordingly, if it is assumed that the 0-th order diffracted light has a phase −π/4 at the left side and a phase π/4 at the right side, the plus $1^{st}$-order diffracted light has a phase 3 π/4 at the left side and −3π/4 at the right side, and the minus $1^{st}$-order diffracted light has a phase −π/4 at the left side and π/4 at the right side. In FIG. 5A, case (3), the light beam 16a is applied to the land 17b. Here, with respect to case (2), the plus $1^{st}$-order diffracted light has a phase delayed by π/2 and the minus $1^{st}$-order diffracted light has a phase advanced by π/2. Accordingly, if it is assumed that the 0-th order diffracted light has a phase −π/4 at the left side and a phase π/4 at the right side, the plus and minus $1^{st}$-order diffracted lights have a phase π/4 at the left side and 3 π/4 at the right side. In FIG. 5A, case (4), the light beam 16a is applied to a boundary between the land 17b and the groove 17a. Here, with respect to case (3), the plus $1^{st}$-order diffracted light has a phase delayed by π/2 and the minus $1^{st}$-order diffracted light has a phase advanced by π/2. Accordingly, if it is assumed that the 0-th order diffracted light has a phase −π/4 at the left side and a phase π/4 at the right side, then the plus $1^{st}$-order diffracted light has a phase −π/4 at the left side and π/4 at the right side, and the minus $1^{st}$-order diffracted light has a phase 3 π/4 at the left side and −3 π/4 at the right side.

FIG. 5B shows an area 15a containing the 0-th order light and the plus $1^{st}$-order diffracted light, and an area 15b containing the 0-th order light and the minus $1^{st}$-order diffracted light, each having an intensity as follows. In FIG. 5A, case (1), the phase difference between the 0-th order light and the plus $1^{st}$-order diffracted light is 0 and they intensify each other by interference, whereas the phase difference between the 0-th order light and the minus $1^{st}$-order diffracted light is π and they weaken each other by interference. Accordingly, the area 15a has a high intensity and the area 15b has a low intensity. In FIG. 5A, case (2), the phase difference between the 0-th order light and the plus $1^{st}$-order diffracted light and the phase difference between the 0-th order light and the minus $1^{st}$-order diffracted light are both π/2. Accordingly, the area 15a and the area 15b have identical intensities. In FIG. 5A, case (3), the phase difference between the 0-th order light and the plus $1^{st}$-order diffracted light is π and they weaken each other by interference, whereas the phase difference between the 0-th order light and the minus $1^{st}$-order diffracted light is 0 and they intensify each other by interference. Accordingly, the area 15a has a low intensity and the area 15b has a high intensity. In FIG. 5A, case (4), the phase difference between the 0-th order light and the plus $1^{st}$-order diffracted light and the phase difference between the 0-th order light and the minus $1^{st}$-order diffracted light are both π/2. Accordingly, the area 15a and the area 15b have identical intensities.

Figure 6:
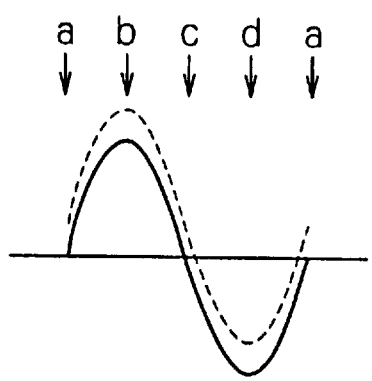
FIG. 6A to FIG. 6F show waveforms related to a track error signal and a land/groove position detecting signal in the optical head apparatus according to the first embodiment of the present invention.
Figure 6:
Figure 6:
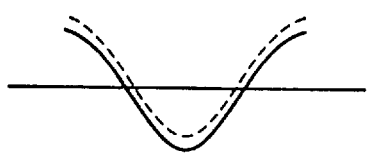
Figure 6:
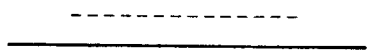
Figure 6:
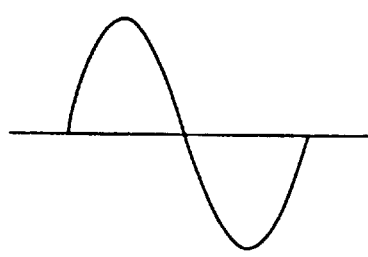
Figure 6:
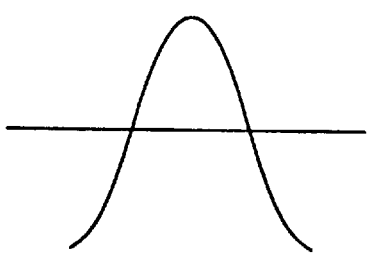

FIG. 6 shows various waveforms associated with a track error signal and a land/groove position detecting signal. The horizontal axis represents a position shift between the focal spot and the track 11 on the disc 6, and arrows 'a' to 'd' correspond to cases (1) to (4), respectively.

In the same way as in the conventional optical head apparatus, the waveform of (V14a+V14b)−(V14c+V14d) is as shown by a solid line in FIG. 6A. The region 15a in FIG. 5B corresponds to the light receiving section 14f of the photo detector 8a. The region 15b in FIG. 5B corresponds to the light receiving section 14e of the photo detector 8a. Here, the waveform of (V14e−V14f) is shown by a solid line in FIG. 6B. Similarly, the waveform of (V14g−V14h) is as shown by a solid line in FIG. 6C. From the waveforms of FIG. 6B and FIG. 6C, the waveform of (V14e+V14g)−(V14f+V14h) is as shown by a solid line in FIG. 6D. From the waveforms of FIG. 6A and FIG. 6D, the track error signal represented by {(V14a+V14b)−(V14c+V14d)}−K{(V14e+V14g)−(V14f+V14h)} can be expressed by a waveform as shown by a solid line in FIG. 6E.

On the other hand, because the waveforms B and C have reversed phases to each other, the land/groove detecting signal obtained from the calculation of (V14e+V14h)−(V14f+V14g) has a waveform as shown by a solid line in FIG. 6F. The signal of FIG. 6F has a phase shifted by π/2 from the track error signal of FIG. 6E so as to be negative and positive when the light beam 16a is applied to the groove 17a and to the land 17b, respectively, thus enabling to detect a land/groove position.

When the objective lens 5 is shifted in a radial direction, the light spots 13a to 13c on the photo detector 8a are also shifted in the radial direction. If it is assumed that the light spots 13a to 13c are shifted upward in FIG. 4, the light receiving sections 14a and 14b increase their outputs and the light receiving sections 14c and 14d decrease their outputs. Accordingly, the waveform of (V14a+V14b)−(V14c+V14d) is as shown by a dotted line in FIG. 6A. The light receiving section 14e increases its output and the light receiving section 14f decreases its output. Accordingly, the waveform of V14e−V14f is as shown by a dotted line in FIG. 6B. Similarly, the waveform of the V14g−V14h is as shown by a dotted line of FIG. 6C. From the waveforms of B and C, the waveform of (V14e+V14g)−(V14f+V14h) is as shown by a dotted line of FIG. 6D. In A and D, DC components at an objective lens shift have identical signs. Accordingly, the waveform of {(V14a+V14b)−(V14c+V14d)}−K{(V14e+V14g)−(V14f+V14h)} is as shown by a solid line in FIG. 6E. That is, even if the objective lens is shifted, no offset is generated in the track error signal. On the other hand, the waveforms of B and C have reversed phases to each other but their DC components have identical signs at an objective lens shift. Accordingly, the land/groove position detecting signal expressed by (V14e+V14h)−(V14f+V14g) has a waveform as shown by a solid line in FIG. 6F. That is, no affect is caused by the objective lens shift.

Next, description will be directed to a second embodiment of the present invention with reference to FIG. 7 to FIG. 11.

The optical head apparatus according to the second embodiment has a configuration identical to that of FIG. 1 except for that the diffraction grating 3a is replaced by a diffraction grating 3b and the photo detector 8a is replaced by a photo detector 8b.

Figure 7:
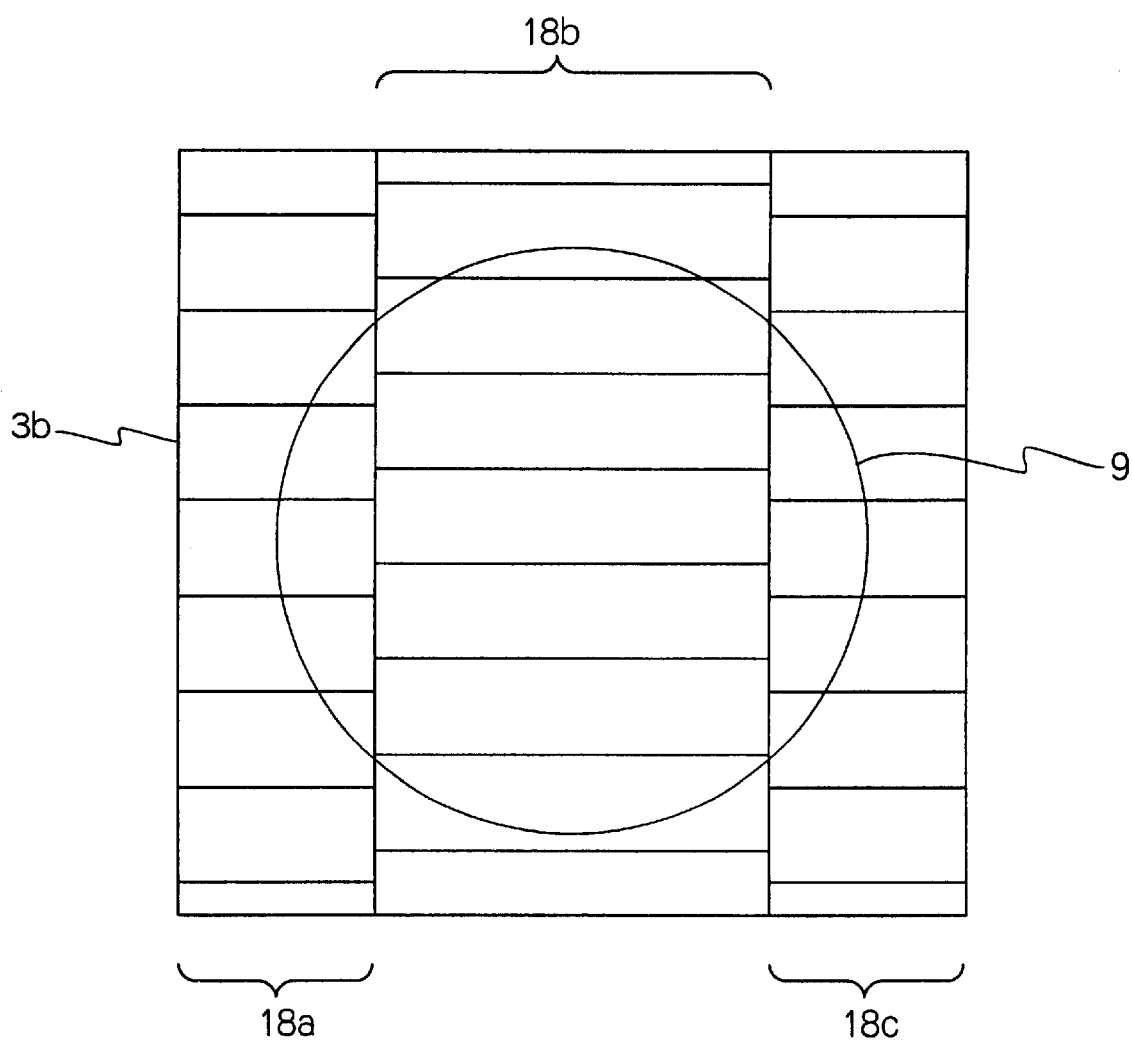
FIG. 7 is a plan view showing a diffraction grating used in an optical head apparatus according to a second embodiment of the present invention.

FIG. 7 is a plan view showing the diffraction grating 3b. The diffraction grating 3b is divided into three regions 18a, 18b, and 18c, by two straight lines in a tangential direction symmetric to the optical axis of the incident light 9. The regions 18a and 18c have phases shifted by π/2 from the phase of region 18b. If it is assumed in FIG. 7 that the plus $1^{st}$-order diffracted light is a light diffracted upward and the minus $1^{st}$-order diffracted light is a light diffracted downward, the plus $1^{st}$-order diffracted light from the region 18a and that from the region 18c have a phase advanced by π/2 with respect to the plus $1^{st}$-order diffracted light from the region 18b, and the minus $1^{st}$-order diffracted light from the region 18a and that from the region 18c have a phase delayed by π/2 with respect to the minus $1^{st}$-order diffracted light from the region 18b.

Figure 8:
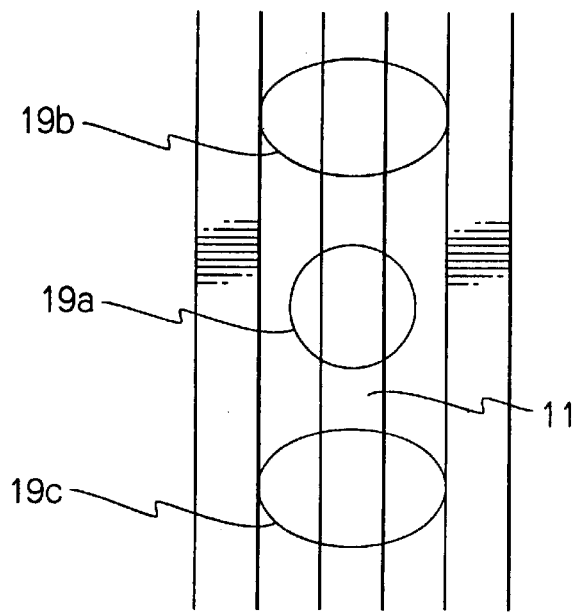
FIG. 8 shows a focal spot arrangement on the disc in the optical head apparatus according to the second embodiment of the present invention.

FIG. 8 shows a focal spot arrangement on the disc 6. Focal spots 19a, 19b, and 19c correspond to the 0-th order light, the plus 1$^{st}$-order diffracted light, and the minus 1$^{st}$-order diffracted light, respectively, and are arranged on a single track 11 (land or groove). The focal spot 19b and 19c have a longer diameter in the radial direction compared to the focal spot 19a.

Figure 9:
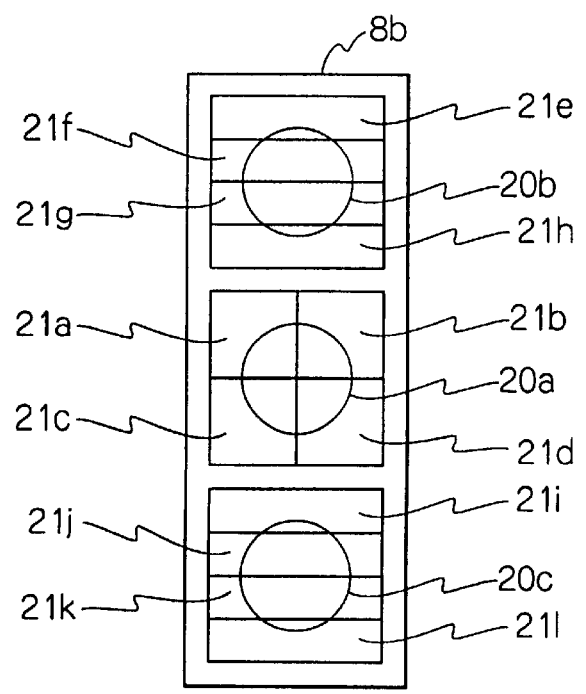
FIG. 9 shows light receiving sections of a photo detector and a light spot arrangement on the photo detector in the optical head apparatus according to the second embodiment of the present invention.

FIG. 9 shows light receiving sections of the photo detector 8b and a light spot arrangement on the photo detector 8b. A light spot 20a corresponds to the 0-th order light from the diffraction grating 3b, which is received by four light receiving sections 21a to 21d divided by two lines: a tangential direction line passing through the optical axis and a radial direction line. A light spot 20b corresponds to the plus 1$^{st}$-order diffracted light from the diffraction grating 3b, which is received by light receiving sections 21e to 21h divided by a tangential direction line passing through the optical axis and two straight lines parallel to this line and symmetric with respect to the optical axis. A light spot 20c corresponds to the minus 1$^{st}$-order diffracted light from the diffraction grating 3b, which is received by light receiving sections 21i to 21l divided by a tangential direction line passing through the optical axis and two lines parallel to this and symmetric with respect to the optical axis. A sequence of the focal spots 19a to 19c on the disc 6 is in a tangential direction, but an optical system is provided so that the sequence of the light spots 20a to 20c on the photo detector 8b is in a radial direction by function of the composite lens 7.

If outputs to the light receiving sections 21a to 21l are assumed to be V21a to V21l, the focus error signal can be obtained according to the astigmatism from the calculation of (V21a+V21d)−(V21b+V21c). The track error signal is obtained according to the differential push-pull method from the calculation of {(V21a+V21b)−(V21c+V21d)}−K{(V21e+V21f+V21i+V21j)−(V21g+V21h+V21k+V21l)} (wherein K is a constant). The land/groove position detecting signal can be obtained from the calculation of (V21e+V21h+V21j+V21k)−(V21f+V21g+V21i+V21l). Moreover, the reproduction signal can be obtained from the calculation of V21a+V21b+V21c+V21d. These calculations can be carried out by a corresponding signal processing system (not depicted).

Phase differences of the 0-th order light, the plus and minus 1$^{st}$-order diffracted lights from the disc 6 caused by a position shift between the focal spot 19a and the track 11 on the disc 6 are as shown in FIG. 21.

Figure 10:
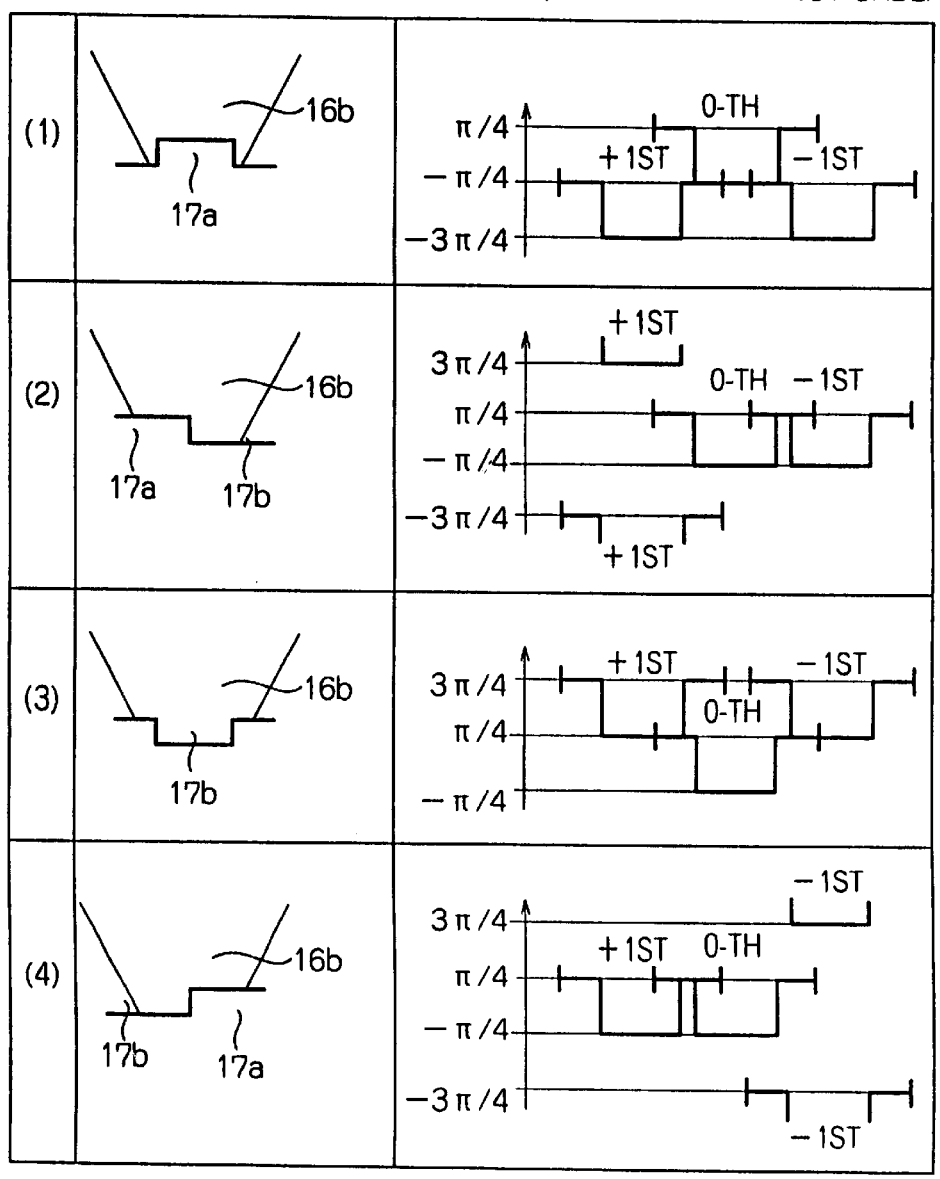
FIG. 10A shows phase changes of the 0-th order light and the plus and minus $1^{st}$-order diffracted lights from the disc caused by a track position shift in the second embodiment.
FIG. 10B shows reflected lights from the disc in the second embodiment.
Figure 10:
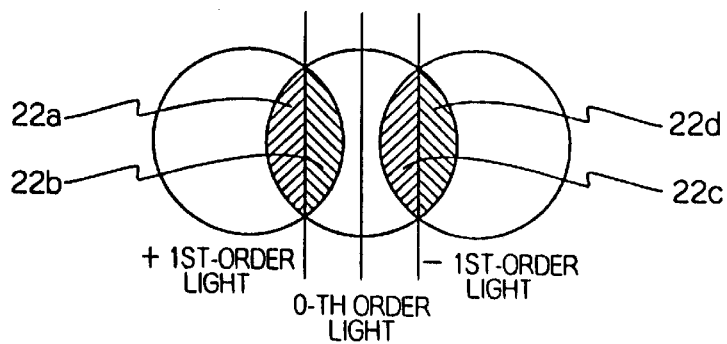

FIG. 10 shows a phase change of the 0-th order light and the plus and minus 1$^{st}$-order diffracted lights from the disc 6 caused by a position shift between the focal spot 19b and the track 11 on the disc 6. The focal spot 19b is formed by a light beam 16b. The light beam 16b has a phase at the outer left and at the outer right advanced by $\pi/2$ with respect to the phase at the center portion.

In FIG. 10A, case (1), the light beam 16b is applied to a groove 17a. Here, if it is assumed that the 0-th order light has a phase $\pi/4$ at the outer left and the outer right and a phase $-\pi/4$ at the center portion, then the plus and minus 1$^{st}$-order diffracted lights have a phase $-\pi/4$ at the outer left and outer right and $-3\pi/4$ at the center portion. In FIG. 10A, case (2), the light beam 16b is applied to a boundary between the groove 17a and the land 17b. Here, with respect to case (1), the plus 1$^{st}$-order diffracted light has a phase delayed by $\pi/2$ and the minus 1$^{st}$-order diffracted light has a phase advanced by $\pi/2$.

Accordingly, if it is assumed that the 0-th order diffracted light has a phase $\pi/4$ at the outer left and the outer right and a phase $-\pi/4$ at the center portion, the plus 1$^{st}$-order diffracted light has a phase $-3\pi/4$ at the outer left and outer right and $3\pi/4$ at the center portion, and the minus 1$^{st}$-order diffracted light has a phase $\pi/4$ at the outer left and outer right and $-\pi/4$ at the center portion. In FIG. 10A, case (3), the light beam 16b is applied to the land 17b. Here, with respect to case (2), the plus 1$^{st}$-order diffracted light has a phase delayed by $\pi/2$ and the minus 1$^{st}$-order diffracted light has a phase advanced by $\pi/2$. Accordingly, if it is assumed that the 0-th order diffracted light has a phase $\pi/4$ at the outer left and outer right and a phase $-\pi/4$ at the center portion, the plus and minus 1$^{st}$-order diffracted lights have a phase $3\pi/4$ at the outer left and outer right and a phase $\pi/4$ at the center potion. In FIG. 10, case (4), the light beam 16b is applied to a boundary between the land 17b and the groove 17a. Here, with respect to case (3), the plus 1$^{st}$-order diffracted light has a phase delayed by $\pi/2$ and the minus 1$^{st}$-order diffracted light has a phase advanced by $\pi/2$. Accordingly, if it is assumed that the 0-th order diffracted light has a phase $\pi/4$ at the outer left and outer right and a phase $-\pi/4$ at the center portion, then the plus 1$^{st}$-order diffracted light has a phase $\pi/4$ at the outer left and right and a phase $-\pi/4$ at the center portion, and the minus 1$^{st}$-order diffracted lights has a phase $-3\pi/4$ at the outer left and right and a phase $3\pi/4$ at the center portion.

FIG. 10B shows an outer region 22a and an inner region 22b containing the 0-th order light and the plus 1$^{st}$-order diffracted light, and an inner region 22c and an outer region 22d containing the 0-th order light and the minus 1$^{st}$-order diffracted light, each having an intensity as follows. In FIG. 10A, case (1), the phase difference between the 0-th order light and the plus 1$^{st}$-order diffracted light is $\pi$ at the outer portions and they weaken each other by interference, and 0 at the center portion and they intensify each other by interference, whereas the phase difference between the 0-th order light and the minus 1$^{st}$-order diffracted light is 0 at the center portion so as to intensify each other by interference, and $\pi$ at the outer portions so as to weaken each other by interference. Accordingly, the region 22a has a low intensity; the region 22b has a high intensity; the region 22c has a high intensity; and the region 22d has a low intensity. In FIG. 10A, case (2), the phase difference between the 0-th order light and the plus 1$^{st}$-order diffracted light and the phase difference between the 0-th order light and the minus 1$^{st}$-order diffracted light are both $\pi/2$ at the outer portions as well as at the center portion. Accordingly, the regions 22a, 22b, 22c and 22d have identical intensities. In FIG. 10A, case (3), the phase difference between the 0-th order light and the plus 1$^{st}$-order diffracted light is 0 at the outer portions so that they intensify each other by interference, and $\pi$ at the center portion so that they weaken each other, whereas the phase difference between the 0-th order light and the minus 1$^{st}$-order diffracted light is $\pi$ at the center portion so that they weaken each other and 0 at the outer portions so that they intensify each other by interference. Accordingly, the region 22a has a high intensity; the region 22b has a low intensity; the region 22c has a low intensity; and the region 22d has a high intensity. In FIG. 10A, case (4), the phase difference between the 0-th order light and the plus 1$^{st}$-order diffracted light and the phase difference between the 0-th order light and the minus 1$^{st}$-order diffracted light are both $\pi/2$ at the outer portions as well as at the center portion. Accordingly, the regions 22a, 22b, 22c, and 22d have identical intensities.

Figure 11:
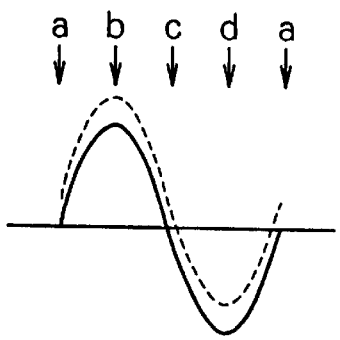
FIG. 11A to FIG. 11H show waveforms related to a track error signal and a land/groove position detecting signal in the optical head apparatus according to the second embodiment of the present invention.

FIG. 11 shows various waveforms associated with a track error signal and a land/groove position detecting signal. The horizontal axis represents a position shift between the focal spot and the track 11 on the disc 6, and arrows 'a' to 'd' correspond to cases (1) to (4) of FIG. 10, respectively.

Figure 11B:
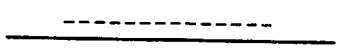
Figure 11C:
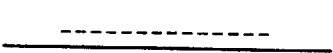
Figure 11D:
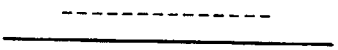
Figure 11E:
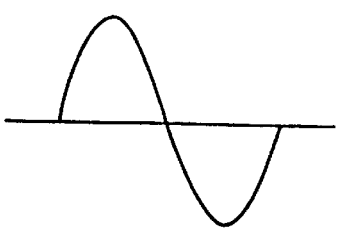

In the same way as in the conventional optical head apparatus, the waveform of (V21a+V21b)−(V21c+V21d) is as shown by a solid line in FIG. 11A. The region 22a in FIG. 10B corresponds to the light receiving section 21h of the photo detector 8b; the region 22b in FIG. 10B corresponds to the light receiving section 21g of the photo detector 8b; the region 22c, to the light receiving section 21f; and the region 22d, to the light receiving section 21e. Here, the waveform of (V21e+V21f)−(V21g +V2h) is shown by a solid line in FIG. 11B. Similarly, the waveform of (V21i+V21j)−(V21k+V21l) is as shown by a solid line in FIG. 11C. From the waveforms of FIG. 11B and FIG. 15C, the waveform of (V21e+V21f+V21i+V21j)−(V21g+V21h+V21k+V21l) is as shown by a solid line in FIG. 11D. From the waveforms of FIG. 11A and FIG. 11D, the track error signal represented by {(V21a+V21b)−(V21c+V21d)}−K{(V21e+V21f+V21i+V21j)−(V21g+V21h+V21k+V21l)} can be expressed by a waveform as shown by a solid line in FIG. 11E.

Figure 11F:
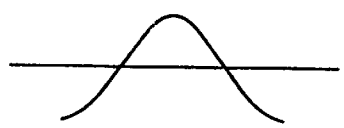
Figure 11G:
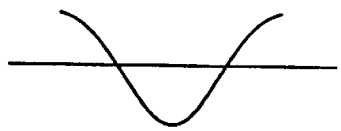
Figure 11H:
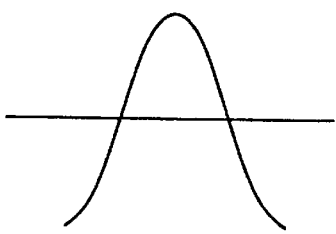

On the other hand, the waveforms of (V21e+V21h)−(V21f+V21g) is as shown by a solid line in FIG. 11F. Similarly, the waveform of (V21i+V21l)−(V21i+V21k) is as shown by a solid line in FIG. 11G. Because the waveforms of F and G have reversed phases to each other, the land/groove detecting signal expressed by (V21e+V21h+V21j+V21k)−(V21f+V21g+V21i+V21l) has a waveform as shown by a solid line in FIG. 11H. The signal of FIG. 11H has a phase shifted by π/2 from the track error signal of FIG. 11E so as to be negative and positive when the light beam 16b is applied to the groove 17a and to the land 17b, respectively, thus enabling to detect a land/groove position.

When the objective lens 5 is shifted in a radial direction, the light spots 20a to 20c on the photo detector 8b are also shifted in the radial direction. If it is assumed that the light spots 20a to 20c are shifted upward in FIG. 9, the light receiving sections 21a and 21b increase their outputs and the light receiving sections 21c and 21d decrease their outputs. Accordingly, the waveform of (V21a+V21b)−(V21c+V21d) is as shown by a dotted line in FIG. 11A. The light receiving section 21e increases its output and the light receiving section 21h decreases its output. Accordingly, the waveform of (V21e+V21f)−(V21g+V21h) is as shown by a dotted line in FIG. 11B. Similarly, the waveform of the (V21i+V21j)−(V21k+V21l) is as shown by a dotted line of FIG. 11C. From the waveforms of B and C, the waveform of (V21e+V21f+V21i +V21j)−(V21g+V21h+V21k+V21l) is as shown by a dotted line of FIG. 11D. In A and D, DC components at an objective lens shift have identical signs. Accordingly, the track error signal expressed by {(V21a+V21b)−(V21c+V21d)}−K{(V21e+V21f+V21i+V21j)−(V21g+V21h+V21k+V21l)} has a waveform as shown by a solid line in FIG. 11E. That is, even if the objective lens is shifted, no offset is generated in the track error signal. On the other hand, the light receiving section 21e increases its output and the light receiving section 21h decreases its output. Accordingly, the waveform of (V21e+V21h)−(V21f+V21g) is as shown by a solid line in FIG. 11F. Similarly, the waveform of (V21i+V21l)−(V21j+V21k) is as shown by a solid line in FIG. 11G. Because the waveforms of F and G have reversed phases to each other, the land/groove position detecting signal expressed by (V21e+V21h+V21j+V21k)−(V21f+V21g+V21i+V21l) has a waveform as shown by a solid line in FIG. 11H.

Next, description will be directed to a third embodiment of the present invention with reference to FIG. 12 to FIG. 16.

The optical head apparatus according to the third embodiment has a configuration identical to that of FIG. 1 except for that the diffraction grating 3a is replaced by a diffraction grating 3c and the photo detector 8a is replaced by a photo detector 8c.

Figure 12:
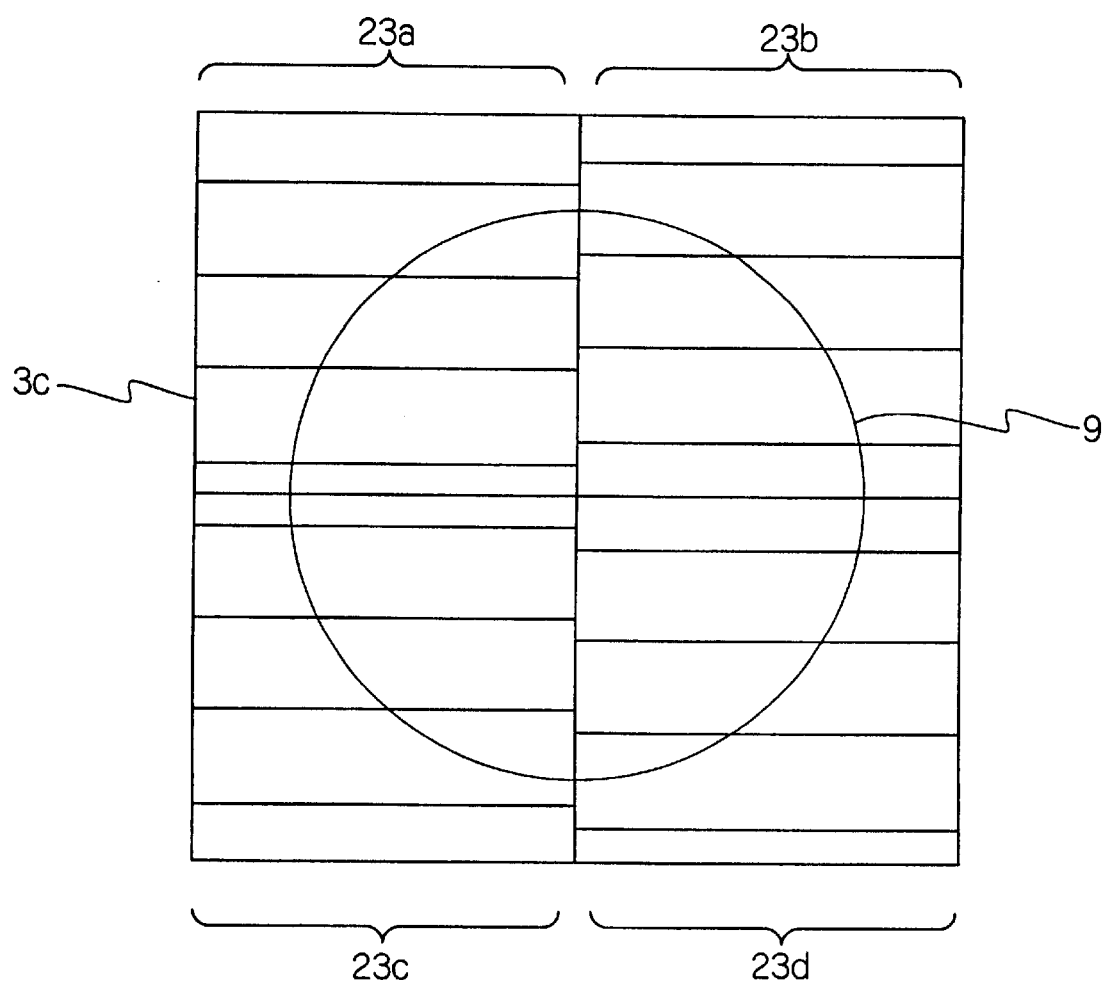
FIG. 12 is a plan view showing a diffraction grating used in an optical head apparatus according to a third embodiment of the present invention.

FIG. 12 is a plan view showing the diffraction grating 3c. The diffraction grating 3c is divided into four regions 23a to 23d by two straight lines in a tangential direction and in a radial direction. The regions 23a and 23b have phases shifted by π/2 from each other and the regions 23c and 23d have phases shifted by π/2 from each other. Moreover, the phases of the regions 23a and 23c are shifted by π/2 from each other and the phases of the regions 23b and 23d are shifted by π/2 from each other. If it is assumed in FIG. 12 that the plus $1^{st}$-order diffracted light is a light diffracted upward and the minus $1^{st}$-order diffracted light is a light diffracted downward, then the plus $1^{st}$-order diffracted light from the region 23a and that from the region 23d have a phase advanced by π/2 with respect to the plus $1^{st}$-order diffracted light from the regions 23b and 23c, whereas the minus $1^{st}$-order diffracted light from the region 23a and that from the region 23d have a phase delayed by π/2 with respect to the minus $1^{st}$-order diffracted light from the regions 23b and 23c.

Figure 13:
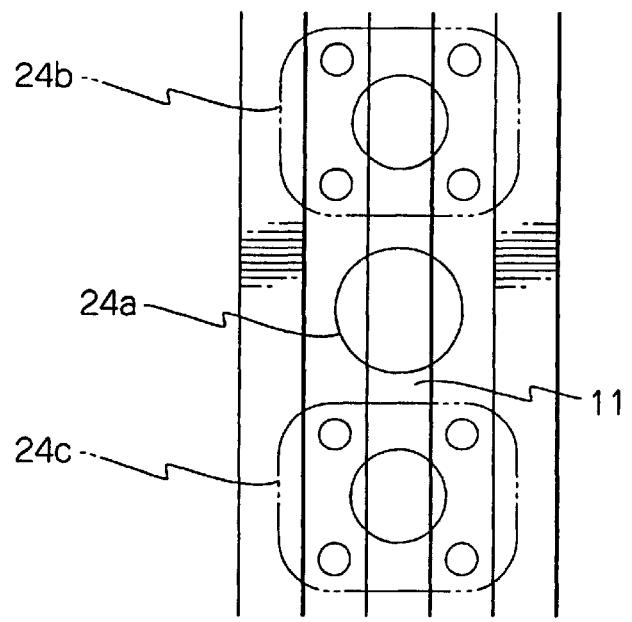
FIG. 13 shows a focal spot arrangement on the disc in the optical head apparatus according to the third embodiment of the present invention.

FIG. 13 shows a focal spot arrangement on the disc 6. Focal spots 24a, 24b, and 24c correspond to the 0-th order light, the plus $1^{st}$-order diffracted light, and the minus $1^{st}$-order diffracted light, respectively, and are arranged on a single track 11 (land or groove). The focal spot 24b and 24c have four side lobes in the direction of plus and minus 45 degrees with respect to the tangential direction and radial direction.

Figure 14:
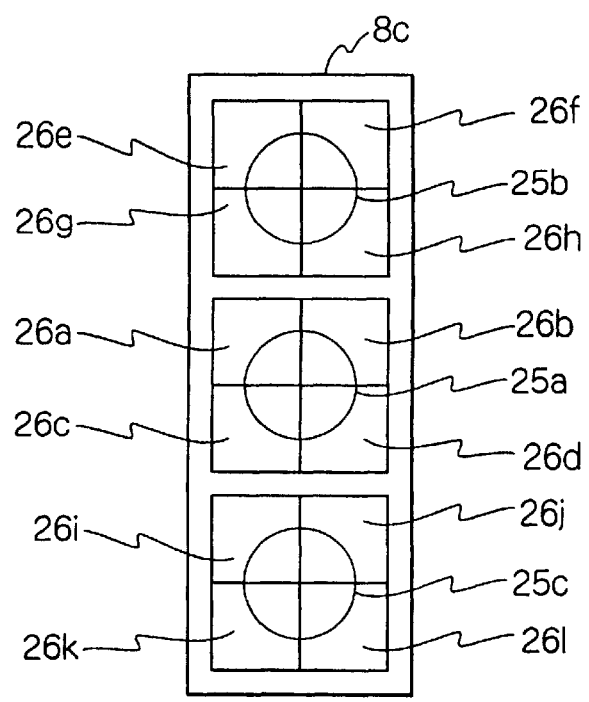
FIG. 14 shows light receiving sections of a photo detector and a light spot arrangement on the photo detector in the optical head apparatus according to the third embodiment of the present invention.

FIG. 14 shows light receiving sections of the photo detector 8c and a light spot arrangement on the photo detector 8c. A light spot 25a corresponds to the 0-th order light from the diffraction grating 3c, which is received by four light receiving sections 26a to 26d divided by two lines: a tangential direction line passing through the optical axis and a radial direction line. A light spot 25b corresponds to the plus $1^{st}$-order diffracted light from the diffraction grating 3c, which is received by four light receiving sections 26e to 26h divided by a tangential direction line passing through the optical axis and a radial direction line. A light spot 25c corresponds to the minus $1^{st}$-order diffracted light from the diffraction grating 3c, which is received by four light receiving sections 26i to 26l divided by a tangential direction line passing through the optical axis and a radial direction line. A sequence of the focal spots 24a to 24c on the disc 6 is in a tangential direction, but an optical system is set so th at the sequence of the light spots 25a to 25c on the photo detector 8c is in a radial direction by function of the composite lens 7.

If outputs to the light receiving sections 26a to 26l are assumed to be V26a to V26l, the focus error signal can be obtained according to the astigmatism from the calculation of (V26a+V26d)−(V26b+V26c). The track error signal is obtained according to the differential push-pull method from the calculation of {(V26a+V26b)−(V26c+V26d)}−K{(V26e+V26f+V26i+V26j)−(V26g+V26h+V26k+V26l)} (wherein K is a constant). The land/groove position detecting signal can be obtained from the calculation of (V26e+V26h+V26j+V26k)−(V26f+V26g+V26i+V26l). Moreover, the reproduction signal can be obtained from the calculation of V26a+V26b+V26c+V26d. These calculations can be carried out by a corresponding signal processing system (not depicted).

Phase differences of the 0-th order light, the plus and minus $1^{st}$-order diffracted lights from the disc 6 caused by a position shift between the focal spot 24a and the track 11 on the disc 6 are as shown in FIG. 21.

Figure 15:
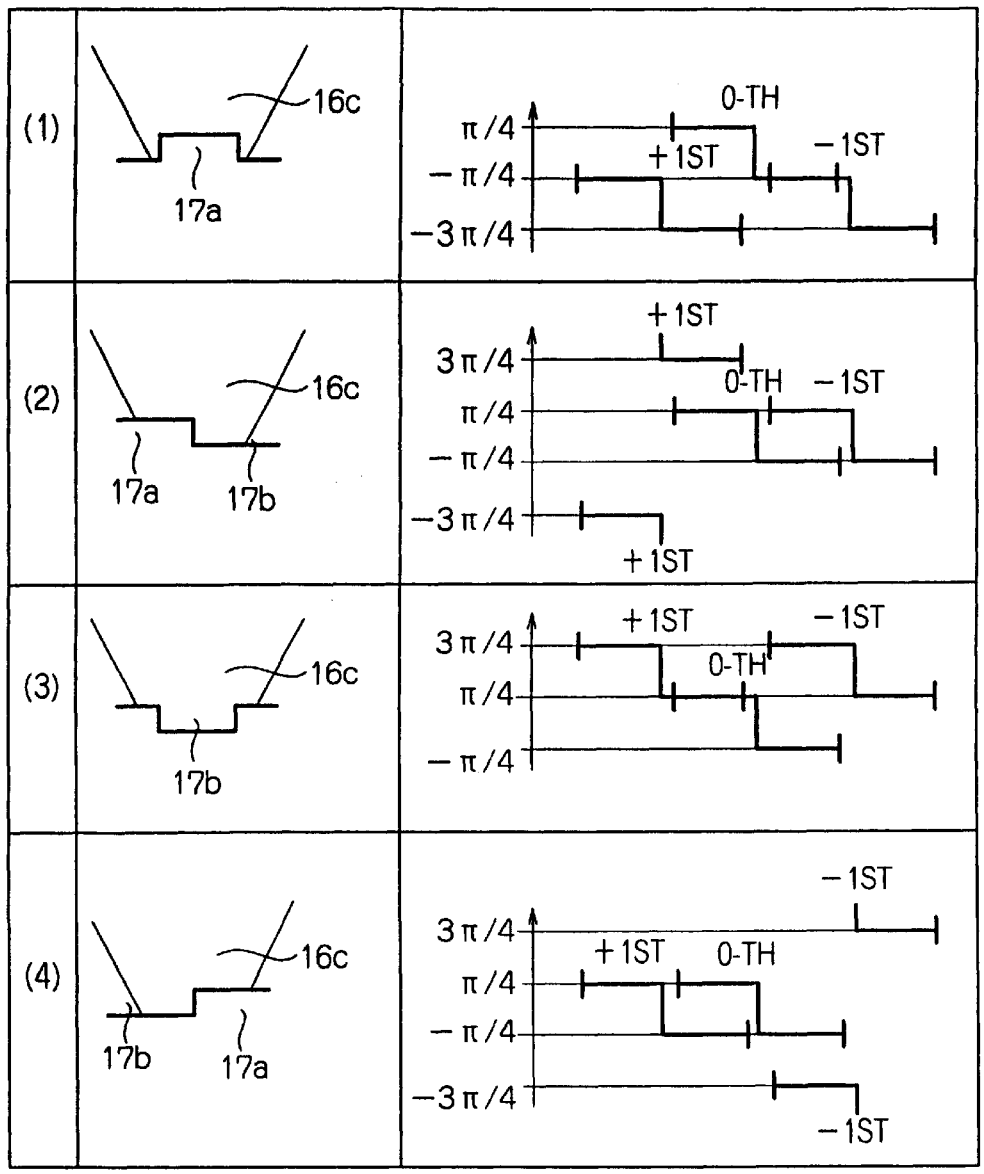
FIG. 15A shows phase changes of the 0-th order light and the plus and minus $1^{st}$-order diffracted lights from the disc caused by a track position shift in the third embodiment.
FIG. 15B shows reflected lights from the disc in the third embodiment.
Figure 15:
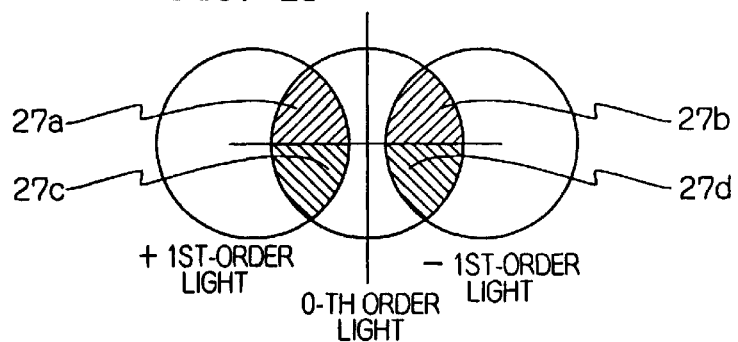

FIG. 15 shows a phase change of the 0-th order light and the plus and minus $1^{st}$-order diffracted lights from the disc 6 caused by a position shift between the focal spot 24b and the track 11 on the disc 6. The focal spot 24b is formed by a light beam 16c. The light beam 16c has a phase at the upper left and at the lower right advanced by π/2 with respect to the phase at the upper right and lower left.

In FIG. 15A, case (1), the light beam 16c is applied to the groove 17a. Here, if it is assumed that the 0-th order light has a phase π/4 at the upper left and at the lower right and a phase −π/4 at the upper right and lower left, then the plus and minus $1^{st}$-order diffracted lights have a phase −π/4 at the upper left and lower right and −3π/4 at the upper right and lower left. In FIG. 15A, case (2), the light beam 16c is applied to a boundary between the groove 17a and the land 17b. Here, with respect to case (1), the plus $1^{st}$-order diffracted light has a phase delayed by π/2 and the minus $1^{st}$-order diffracted light has a phase advanced by π/2. Accordingly, if it is assumed that the 0-th order diffracted light has a phase π/4 at the upper left and the lower right and a phase −π/4 at the upper right and lower left, then the plus $1^{st}$-order diffracted light has a phase −3 π/4 at the upper left and lower right and 3 π/4 at the upper right and lower left, whereas the minus $1^{st}$-order diffracted light has a phase π/4 at the upper left and lower right and −π/4 at the upper right and lower left. In FIG. 15A, case (3), the light beam 16c is applied to the land 17b. Here, with respect to case (2), the plus $1^{st}$-order diffracted light has a phase delayed by π/2 and the minus $1^{st}$-order diffracted light has a phase advanced by π/2. Accordingly, if it is assumed that the 0-th order diffracted light has a phase π/4 at the upper left and lower right and a phase −π/4 at the upper right and lower left, then the plus and minus $1^{st}$-order diffracted lights have a phase 3 π/4 at the upper left and lower right and a phase π/4 at the upper right and lower left. In FIG. 15A, case (4), the light beam 16c is applied to a boundary between the land 17b and the groove 17a. Here, with respect to case (3), the plus $1^{st}$-order diffracted light has a phase delayed by π/2 and the minus $1^{st}$-order diffracted light has a phase advanced by π/2. Accordingly, if it is assumed that the 0-th order diffracted light has a phase π/4 at the upper left and lower right and a phase −π/4 at the upper right and lower left, then the plus $1^{st}$-order diffracted light has a phase π/4 at the upper left and lower right and a phase −π/4 at the upper right and lower left, whereas the minus $1^{st}$-order diffracted light has a phase −3 π/4 at the upper left and lower right and a phase 3 π/4 at the upper right and lower left. It should be noted that in the figures, only the phases at the upper left and the upper right are shown.

FIG. 15B shows an upper region 27a and a lower region 27c containing the 0-th order light and the plus $1^{st}$-order diffracted light, and an upper region 27b and a lower region 27d containing the 0-th order light and the minus $1^{st}$-order diffracted light, each having an intensity as follows. In FIG. 15A, case (1), the phase difference between the 0-th order light and the plus $1^{st}$-order diffracted light is π at the upper regions and they weaken each other by interference, and 0 at the lower regions and they intensify each other by interference, whereas the phase difference between the 0-th order light and the minus $1^{st}$-order diffracted light is 0 at the upper regions so that they intensify each other by interference, and π at the lower regions so that they weaken each other by interference. Accordingly, the region 27a has a low intensity; the region 27b has a high intensity; the region 27c has a high intensity; and the region 27d has a low intensity. In FIG. 15A, case (2), the phase difference between the 0-th order light and the plus $1^{st}$ order diffracted light and the phase difference between the 0-th order light and the minus $1^{st}$-order diffracted light are both π/2 at the upper regions as well as at the lower regions. Accordingly, the regions 27a, 27b, 27c, and 27d have identical intensities. In FIG. 15, case (3), the phase difference between the 0-th order light and the plus $1^{st}$-order diffracted light is 0 at the upper regions so that they intensify each other by interference, and π at the lower regions so that they weaken each other, whereas the phase difference between the 0-th order light and the minus $1^{st}$-order diffracted light is π at the upper regions so that they weaken each other and 0 at the lower regions so that they intensify each other by interference. Accordingly, the region 27a has a high intensity; the region 27b has a low intensity; the region 27c has low intensity; and the region 27d has a high intensity. In FIG. 15A, case (4), the phase difference between the 0-th order light and the plus $1^{st}$-order diffracted light and the phase difference between the 0-th order light and the minus $1^{st}$-order diffracted light are both π/2 at the upper regions as well as at the lower regions. Accordingly, the regions 27a, 27b, 27c, and 27d have identical intensities.

Figure 16:
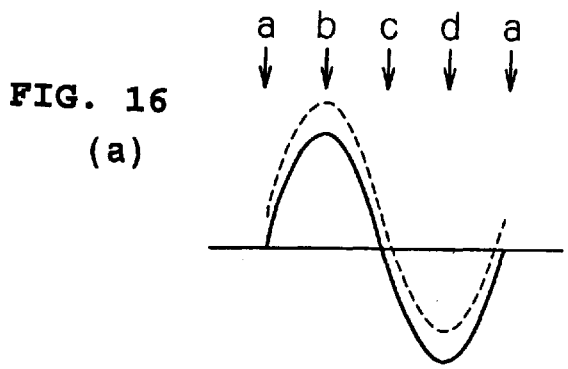
FIG. 16A to FIG. 16H show waveforms related to a track error signal and a land/groove position detecting signal in the optical head apparatus according to the third embodiment of the present invention.
Figure 16:
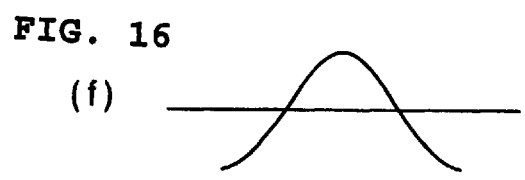
Figure 16:
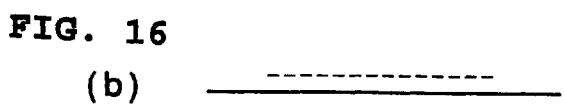
Figure 16:
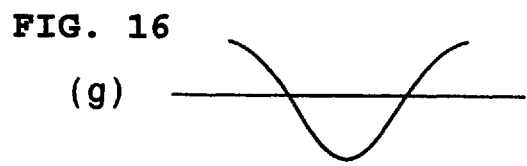
Figure 16:
Figure 16:
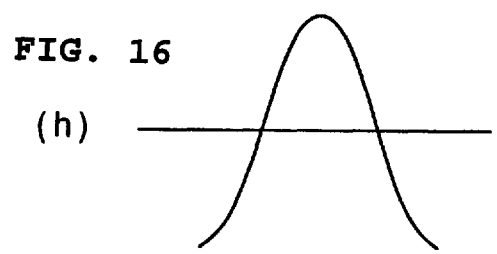
Figure 16:
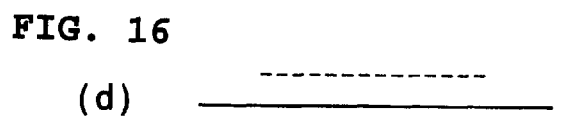
Figure 16:
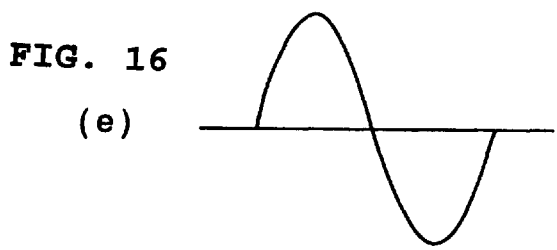
Figure 17:
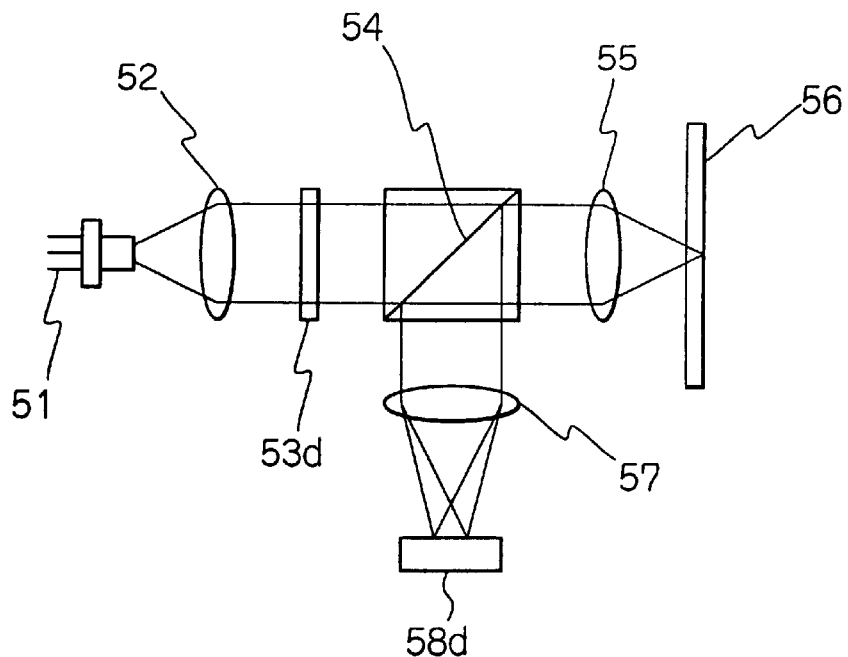
FIG. 17 is a block diagram showing a configuration of a conventional optical head apparatus.
Figure 18:
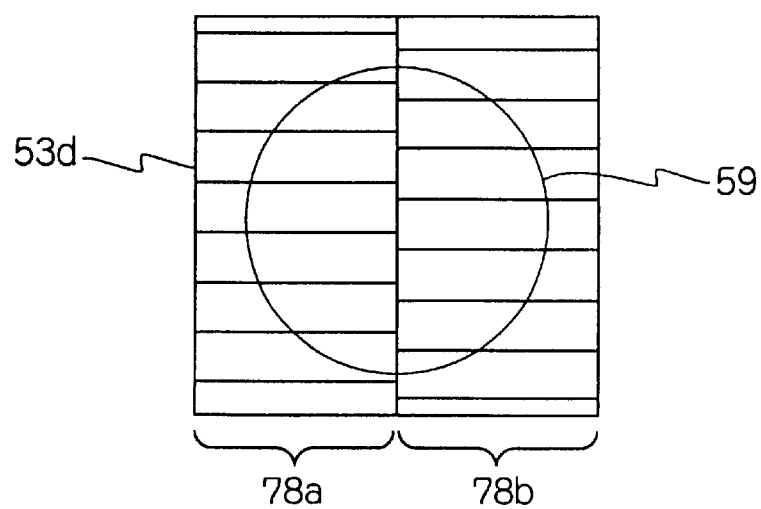
FIG. 18 is a plan view showing a diffraction grating used in the conventional optical head apparatus.
Figure 19:
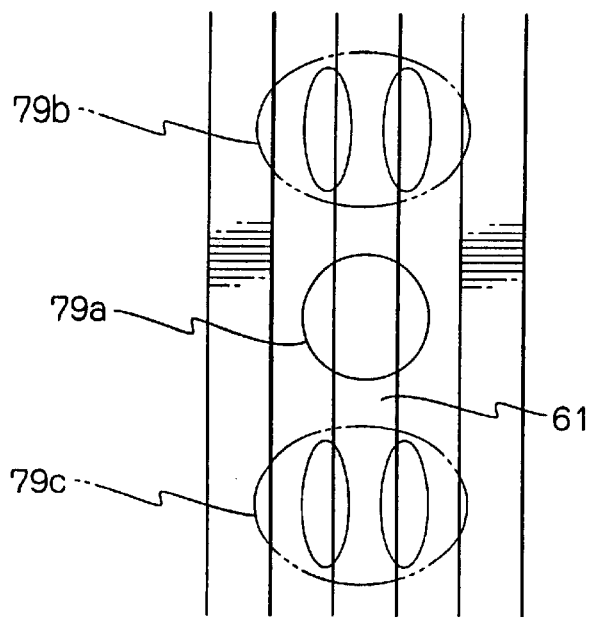
FIG. 19 shows a focal spot arrangement on a disc in the conventional optical head apparatus.
Figure 20:
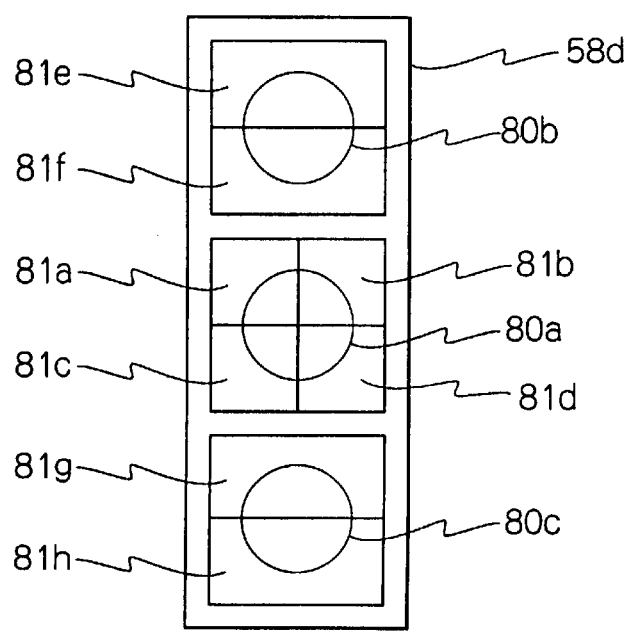
FIG. 20 shows light receiving sections of a photo detector and a light spot arrangement on the photo detector in the conventional optical head apparatus.

FIG. 16 shows various waveforms associated with a track error signal and a land/groove position detecting signal. The horizontal axis represents a position shift between the focal spot and the track 11 on the disc 6, and arrows 'a' to 'd' correspond to cases (1) to (4) of FIG. 15, respectively.

In the same way as in the conventional optical head apparatus, the waveform of (V26a+V26b)−(V26c+V26d) is as shown by a solid line in FIG. 16A. The region 27a in FIG. 15B corresponds to the light receiving section 26h of the photo detector 8c; the region 27b in FIG. 15B corresponds to the light receiving sections 26f of the photo detector 8c; the region 27c, to the light receiving section 26g; and the region 27d, to the light receiving section 26e. Here, the waveform of (V26e+V26f)−(V26g+V26h) is shown by a solid line in FIG. 16B. Similarly, the waveform of (V26i+V26j)−(V26k+V26l) is as shown by a solid line in FIG. 16C. From the waveforms of FIG. 16B and FIG. 16C, the waveform of (V26e+V26f+V26i+V26j)−(V26g+V26h+V26k+V26l) is as shown by a solid line in FIG. 16D. From the waveforms of FIG. 16A and FIG. 16D, the track error signal represented by {(V26a+V26b)−(V26c+V26d)}−K{(V26e+V26f+V26i+V26j)−(V26g+V26h+V26k+V26l)} can be expressed by a waveform as shown by a solid line in FIG. 16E.

On the other hand, the waveforms of (V26e+V26h)−(V26f+V26g) is as shown by a solid line in FIG. 16F. Similarly, the waveform of (V26i+V26l)−(V26j+V26k) is as shown by a solid line in FIG. 16G. Because the waveforms of F and G have reversed phases to each other, the land/groove detecting signal expressed by (V26e+V26h+V26j+V26k)−(V26f+V26g+V26i+V26l) has a waveform as shown by a solid line in FIG. 16H. The signal of FIG. 16H has a phase shifted by π/2 from the track error signal of FIG. 16E so as to be negative and positive when the light beam 16c is applied to the groove 17a and to the land 17b, respectively, thus enabling to detect a land/groove position.

When the objective lens 5 is shifted in a radial direction, the light spots 25a to 25c on the photo detector 8c are also shifted in the radial direction. If it is assumed that the light spots 25a to 25c are shifted upward in FIG. 14, the light receiving sections 26a and 26b increase their outputs and the light receiving section 26c and 26d decrease their outputs. Accordingly, the waveform of (V26a+V26b)−(V26c+V26d) is as shown by a dotted line in FIG. 16A. The light receiving sections 26e and 26f increase their outputs and the light receiving sections 26g and 26h decrease their outputs. Accordingly, the waveform of (V26e+V26f)−(V26g+V26h) is as shown by a dotted line in FIG. 16B. Similarly, the waveform of the (V26i+V26j)−(V26k+V26l) is as shown by a dotted line of FIG. 16C. From the waveforms of B and C, the waveform of (V26e+V26f+V26i +V26j)−(V26g+V26h+V26k+V26l) is as shown by a dotted line of FIG. 16D. In A and D, DC components at an objective lens shift have identical signs. Accordingly, the track error signal expressed by {(V26a+V26b)−(V26c+V26d)}−K{(V26e+V26f+V26i+V26j)−(V26g+V26h+V26k+V26l)} has a waveform as shown by a solid line in FIG. 16E. That is, even if the objective lens is shifted, no offset is generated in the track error signal. On the other hand, the light receiving sections 26e and 26f increase their outputs and the light receiving sections 26g and 26h decrease their outputs. Accordingly, the waveform of (V26e+V26h)−(V26f+V26g) is as shown by a solid line in FIG. 16F. Similarly, the waveform of (V26i+V26l)−(V26j+V26k) is as shown by a solid line in FIG. 16G. Because the waveforms of F and G have reversed phases to each other, the land/groove position detecting signal expressed by (V26e+V26h+V26j+V26k)−(V26f+V26g+V26i+V26l) has a waveform as shown by a solid line in FIG. 16H.

Here, if the disc 6 has an eccentricity, the sequence of the focal spots on the disc 6 is shifted from the tangential direction. In the first embodiment of the present invention, the phases of the waveforms in FIG. 6B and FIG. 6C are shifted in opposite directions to each other with respect to the phase of the waveform in FIG. 6A. If the waveform of FIG. 6A is expressed by A (sin X+C) (wherein C represents a DC component at an objective lens shift), the waveforms of FIG. 6B and FIG. 6C can be expressed by {−cos(X+Δ)+C} and {B cos(X−Δ)+C} (wherein Δ is a phase shift amount caused by an eccentricity), respectively. Then, the waveform of FIG. 6D can be expressed as follows:

$$B\{-\cos(X+\Delta)+C\}+B\{\cos(X-\Delta)+C\} = 2B(\sin X \sin \Delta + C)$$

The waveform of FIG. 6E can be expressed as follows:

$$A(\sin X+C)-2KB(\sin X \sin \Delta + C) = (A-2KB \sin \Delta)\sin X + (A-2KB)C$$

The condition for causing no offset in the track error signal when the objective lens is shifted is K=A/2B. Consequently, the waveform of FIG. 6E is A(1−sin Δ)sin X. That is, the eccentricity changes the amplitude of the track error signal by (1−sin Δ). On the other hand, in the second and the third embodiments of the present invention, the waveforms of FIG. 11B and FIG. 11C as well as FIG. 16B and FIG. 16C consists of only DC components at the objective lens shift. Accordingly, the eccentricity will cause no change in the amplitude of the track error signal.

Here, in the first, the second, and the third embodiments, a light reflected from the disc 6 is received by a photo detector divided into a plurality of regions. However, it is also possible to provide between the disc 6 and the photo detector a holographic optical element divided into a plurality of regions so that diffracted lights from the plurality of regions are received by a plurality of light receiving sections of a photo detector.

In the optical head apparatus having the aforementioned configuration, a diffraction grating divided into a plurality of regions having phases shifted by π/2 to each other divides a light emitted from a light source into a 0-th order light and plus and minus $1^{st}$ order diffracted lights and three focal spots are arranged on a single track of an optical recording medium, so as to generate, according to the plus and minus $1^{st}$-order diffracted lights reflected from the optical recording medium, a signal having a phase shifted by π/2 with respect to a track error signal for use in detecting a land/groove position. Thus, it is possible to detect a land/groove position while preventing a offset of a track error signal at an objective lens shift.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-299079 (Filed on Oct. $30^{th}$, 1997) including specification, claims, drawings and summary are incorporated herein by reference in its entirety.

What is claimed is:

1. An optical head apparatus comprising:
a light source;
a diffraction grating for dividing light from said light source into a plus first order diffracted light, a zero order light, and a minus first order diffracted light;
an objective lens for focusing light passing through said diffraction grating onto an information recording plane of an optical recording medium;
a photo detector for receiving a reflected light from said optical recording medium; and
a signal processing circuit for generating a track error signal according to an output of said photo detector,
wherein said diffraction grating has a light incident plane divided into a plurality of regions so that adjacent regions have diffracted light phases shifted by π/2 radians from each other and said plus first order diffracted light, said zero order light, and said minus first order diffracted light are controlled to be arranged on a single land or groove of said optical recording medium,
wherein said diffraction grating is constructed so that a pitch and direction of each of said regions of said diffraction grating are identical;
wherein said photo detector has a plurality of light receiving blocks for receiving said plus first order diffracted light and said minus first order diffracted light corresponding to said plurality of regions of said diffraction grating, and
wherein said signal processing circuit generates, according to outputs of said plurality of light receiving blocks, a position detecting signal for deciding whether a focal spot on said optical recording medium is arranged on said land or said groove.

2. An optical head apparatus as claimed in claim 1, wherein said plurality of regions comprises two regions divided by a straight line parallel to a track of said optical recording medium.

3. An optical head apparatus as claimed in claim 2, wherein each of said light receiving block for said plus first order light and said light receiving block for said minus first order light is divided into two regions by a straight line parallel to a track of said optical recording medium.

4. An optical head apparatus as claimed in claim 3, wherein said signal processing circuit generates a value representing a difference between a sum of outputs of said plus and minus first order lights from outer regions and a sum of outputs of said plus and minus first order lights from inner regions, so as to obtain said position detecting signal.

5. An optical head apparatus as claimed in claim 1, wherein said plurality of regions comprises three regions divided by straight lines parallel to a track of said optical recording medium.

6. An optical head apparatus as claimed in claim 5, wherein each of said light receiving block for said plus first order light and said light receiving block for said minus first order light is divided into three regions by straight lines parallel to a track of said optical recording medium.

7. An optical head apparatus as claimed in claim 6, wherein said signal processing circuit generates a value representing a difference between a sum of outputs of said plus first order light from two outer regions and said minus first order light from an inner region and said minus first order light from two outer regions, so as to obtain said position detecting signal.

8. An optical head apparatus as claimed in claim 1, wherein said plurality of regions comprises four regions divided by a line parallel to a track of said optical recording medium and a line vertical to said track.

9. An optical head apparatus as claimed in claim 8, wherein each of said light receiving block for said plus first order light and said light receiving block for said minus first order light is divided into four regions by a straight line parallel to a track of said optical recording medium and a straight line vertical to said track.

10. An optical head apparatus as claimed in claim 9, wherein said signal processing circuit generates a value representing a difference between a sum of outputs of plus first order light from two regions in a first diagonal direction and minus first order light from two regions in a second diagonal direction and a sum of outputs of plus first order light from two regions in said second diagonal direction and minus first order light from two regions in said first diagonal direction, so as to obtain said position detecting signal.

11. An optical head apparatus as claimed in claim 1, further comprising a holographic optical element arranged between said optical recording medium and said photo detector, for diffracting a reflected light from said optical recording medium.

12. The optical head apparatus as claimed in claim 1, wherein a width of said land and a width of said groove are equal.

13. The optical head apparatus as claimed in claim 1, wherein said position detecting signal has a phase shifted by $\pi/2$ radians from a track error signal.

14. The optical head apparatus as claimed in claim 1, wherein said position detecting signal has a negative value when a reflected light beam is applied to said groove, and has a positive value when said zero order light beam is applied to said land.

15. The optical head apparatus as claimed in claim 1, wherein a track error signal has no offset when said objective lens is shifted.

16. The optical head apparatus as claimed in claim 1, wherein said zero order light, said plus first order light and said minus first order light are all focused on a center of said land or said groove.

17. The optical head apparatus as claimed in claim 1, wherein a direction and pitch of gratings on different regions are identical.

18. The optical head apparatus as claimed in claim 1, wherein diffracted lights from different regions of said diffraction grating are focused on a same location of said photo detector.

* * * * *